(12) United States Patent
Miyauchi et al.

(10) Patent No.: US 8,400,885 B2
(45) Date of Patent: Mar. 19, 2013

(54) THERMALLY-ASSISTED MAGNETIC RECORDING HEAD, HEAD GIMBAL ASSEMBLY AND MAGNETIC RECORDING DEVICE

(75) Inventors: Daisuke Miyauchi, Tokyo (JP); Tetsuya Roppongi, Tokyo (JP); Kosuke Tanaka, Tokyo (JP); Tsutomu Chou, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/097,133

(22) Filed: Apr. 29, 2011

(65) Prior Publication Data
US 2012/0275280 A1 Nov. 1, 2012

(51) Int. Cl.
*G11B 13/08* (2006.01)
(52) U.S. Cl. ............. 369/13.17; 369/13.33; 360/59
(58) Field of Classification Search ......... 369/13.33, 369/13.13, 13.32, 13.17, 112.09, 112.14, 369/112.21, 112.27, 122.27, 122.09, 59; 360/59; 385/129, 31, 88–94
See application file for complete search history.

(56) References Cited

U.S. PATENT DOCUMENTS

| | | | |
|---|---|---|---|
| 2010/0061200 A1* | 3/2010 | Shimazawa et al. | 369/13.33 |
| 2010/0091619 A1* | 4/2010 | Hirata et al. | 369/13.24 |
| 2010/0103553 A1* | 4/2010 | Shimazawa et al. | 360/59 |
| 2010/0260015 A1 | 10/2010 | Sasaki et al. | |

FOREIGN PATENT DOCUMENTS

| | | |
|---|---|---|
| JP | A-2005-4901 | 1/2005 |
| JP | A-2008-276819 | 11/2008 |
| JP | A-2010-92514 | 4/2010 |
| JP | A-2010-244670 | 10/2010 |

* cited by examiner

*Primary Examiner* — Joseph Feild
*Assistant Examiner* — Andrew Sasinowski
(74) *Attorney, Agent, or Firm* — Posz Law Group, PLC

(57) ABSTRACT

A thermally-assisted magnetic recording head includes: a pole that generates a writing magnetic field from an end surface that forms a part of an air bearing surface that opposes a magnetic recording medium; a waveguide that propagates light to excite surface plasmon; and a plasmon generator that is provided between the pole and the waveguide and that generates near-field light from a near-field light generating end surface that forms a part of the air bearing surface by coupling with the light in a surface plasmon mode. The plasmon generator includes a flat plate part and a projection part that projects from the flat plate part to the waveguide side and is provided closer to a trailing side than the pole is.

18 Claims, 13 Drawing Sheets

THERMALLY-ASSISTED MAGNETIC RECORDING HEAD, HEAD GIMBAL ASSEMBLY AND MAGNETIC RECORDING DEVICE

BACKGROUND OF THE INVENTION

1. Field of the Invention

The present invention relates to a head for a thermally assisted magnetic recording that records data by emitting near-field (NF) light on a magnetic recording medium and by decreasing an anisotropic magnetic field of the magnetic recording medium and to a head gimbal assembly and a magnetic recording device that uses such head.

2. Description of the Related Art

In the field of magnetic recording using a head and a medium, further improvements have been demanded in performance of thin film magnetic heads and magnetic recording media in view of an increase in recording density of magnetic disk devices. For the thin film magnetic heads, composite type thin film magnetic heads configured from lamination of a reading magnetoresistive (MR) element and a writing electromagnetic conversion element are being widely used.

The magnetic recording medium is a non-continuous medium, in which magnetic microparticles are aggregated. Each magnetic microparticle has a single magnetic domain. In this magnetic recording medium, a single recording bit is configured by a plurality of magnetic microparticles. Therefore, to increase magnetic density, the size of the magnetic microparticles must be reduced, and asperity at a border of adjacent recording bits needs to be minimized. However, if the size of the magnetic microparticles is reduced, there is a problem that thermal stability for magnetization of the magnetic microparticles is lowered as the volume of the magnetic microparticles is reduced.

To address this problem, increasing magnetic anisotropic energy Ku of magnetic microparticles may be considered. However, this increase in Ku causes an increase in anisotropic magnetic field (coercive force) of the magnetic recording medium. On the other hand, the upper limit of the writing magnetic field intensity for the thin film magnetic head is determined substantially by saturation magnetic flux density of a soft magnetic material forming a magnetic core in the head. As a result, when the anisotropic magnetic field of the magnetic recording medium exceeds an acceptable value determined from the upper value of the writing magnetic field intensity, writing becomes impossible. Currently, as a method to solve such a problem of thermal stability, a so-called thermally assisted magnetic recording method has been proposed, which, using a magnetic recording medium formed by a magnetic material with large Ku, performs the writing by heating the magnetic recording medium immediately before applying the writing magnetic field to reduce the anisotropic magnetic field.

For this thermally assisted magnetic recording method, a method that uses a near-field light probe, a so-called plasmon generator, which is a piece of metal that generates near-field light from plasmon excited by emission of laser light, is known.

A magnetic recording head provided with a conventional plasmon generator has a configuration in which a main pole is provided on a trailing side of a near-field light generating portion of the plasmon generator and in which a waveguide that propagates light is provided so as to oppose the plasmon generator. This plasmon generator excites surface plasmon by coupling with the light that propagates through the waveguide in surface plasmon mode and generates near-field light at the near-field light generating portion as a result of propagation by this surface plasmon propagating through the plasmon generator. Furthermore, a magnetic recording medium is heated by the near-field light generated at the near-field light generating portion of the plasmon generator, an isotropic magnetic field of the magnetic recording medium is reduced, and thereby information is written. However, with a magnetic recording head having this configuration, after the temperature rises due to heating, the magnetic field is also applied to the magnetic recording medium during the cooling process. Accordingly, after the application of the magnetic field for recording is completed, the magnetic field is further applied even onto the magnetic microparticles where the magnetization has not yet stabilized. Therefore, there is a problem that sufficient signal-to-noise ratio (S/N ratio) cannot be obtained at high recording density.

Therefore, in order to achieve high recording density and obtain a sufficient S/N ratio, a configuration, in which a magnetic field is applied prior to heating the magnetic recording medium, is conceivable. Or in other words, that is a configuration where the plasmon generator of a conventional magnetic recording head is provided on the trailing side of the main pole. A magnetic recording head as described in Japanese Patent Publication No. 2010-244670 has been proposed as a magnetic recording head with this configuration. With this magnetic recording head, it is thought that almost no magnetic field is applied to the magnetic recording medium during the cooling process, therefore, rapid magnetization reversal is possible in the adjacent magnetic domains on the magnetic recording medium, and that the requirements for high recording density and sufficient S/N ratio can be satisfied. However, the light spot diameter of the near-field light irradiated on the magnetic recording medium by the near-field light generating portion is currently being required to be even smaller because of demand for even higher recording density in recent years.

SUMMARY OF THE INVENTION

An object of the present invention is to provide a thermally-assisted magnetic recording head that further reduces a light spot diameter of near-field light irradiated onto a magnetic recording medium from a near-field light generating portion of a plasmon generator, and to provide a head gimbal assembly and a magnetic recording device that uses this head.

In order to achieve the object, the present invention provides a thermally-assisted magnetic recording head including: a pole that generates a writing magnetic field from an end surface that forms a part of an air bearing surface that opposes a magnetic recording medium; a waveguide that propagates light to excite surface plasmon; and a plasmon generator that is provided between the pole and the waveguide and that generates near-field light from a near-field light generating end surface that forms a part of the air bearing surface by coupling with the light in a surface plasmon mode. The plasmon generator includes a flat plate part which at least partly contacts the pole and a projection part (convex part) that projects from the flat plate part to the waveguide side and is provided closer to a trailing side than the pole is (first invention).

With the present invention, the near-field light generating end surface refers to an end surface that configures a portion of the air bearing surface in a plasmon generator.

In the first invention, it is preferred that the projection part is contiguous from the near-field light generating end surface along a light propagating direction of the waveguide (second invention). It is preferred that a protrusion height of the projection part is from 20 to 30 nm (third invention). It is preferred that a length of the plasmon generator in a light propagation direction of the waveguide is no less than a length of the pole in the light propagation direction (fourth invention), further that the length is from 1 to 14 µm (fifth invention). It is preferred that a width of the pole as viewed from the air bearing surface is from 0.2 to 0.3 µm, in a direction approximately orthogonal to a direction of travel of the magnetic recording medium (sixth invention).

Further, in the first invention, it is preferred that a shape of a surface of the projection part that opposes the waveguide is approximately a trapezoidal shape with a short side located on the air bearing surface side, a long side approximately parallel to the short side, and two oblique sides (seventh invention). In the seventh invention, an angle formed by the oblique sides with regards to a direction perpendicular to the air bearing surface is less than 10° (eighth invention).

In the first invention, it is preferred that a length from a lower end of the flat plate part to an upper end of the projection part is from 45 to 75 nm, as viewed from the air bearing surface side such that the waveguide is located closer to the trailing side than the plasmon generator (ninth invention). It is preferred that a gap between a lower end of the waveguide and an upper end of the projection part is from 15 to 40 nm, as viewed from the air bearing surface side such that the waveguide is located closer to the trailing side than the plasmon generator (tenth invention).

Further, the present invention provides a head gimbal assembly, including: the thermally-assisted magnetic recording head with respect to the above first invention; and a suspension that supports the thermally-assisted magnetic recording head (eleventh invention).

Furthermore, the present invention provides a magnetic recording device, including: a magnetic recording medium; the thermally-assisted magnetic recording head with respect to the above invention (first invention); and a positioning device that supports the thermally-assisted magnetic recording head and determines a position with regards to the magnetic recording medium (twelfth invention).

The present invention provides a thermally-assisted magnetic recording head that further reduces the light spot diameter of the near-field light irradiated onto the magnetic recording medium from the near-field light generating portion of the plasmon generator, and provides a head gimbal assembly and a magnetic recording device that uses this recording head.

DESCRIPTION OF THE PREFERRED EMBODIMENTS

Before explaining embodiments of the present invention, terminologies used in the present specification are defined. In a lamination structure or an element structure formed on an element formation surface of a slider substrate of a magnetic recording head according to embodiments of the present invention, from a reference layer or element, the substrate side is called "downward (lower direction)," and the opposite side is called "upward (upper direction)." In addition, in the magnetic recording head according to embodiments of the present invention, some of the drawings provide "X, Y and Z axis directions" if necessary. Here, the Z axis direction is the above-described "up and down directions." +Z side corresponds to a trailing side, and −Z side corresponds to a leading side. Moreover, the Y axis direction is a track width direction, and the X axis direction is a height direction A thermally assisted magnetic recording head according to an embodiment of the present invention is explained with reference to the drawings.

Figure 1:
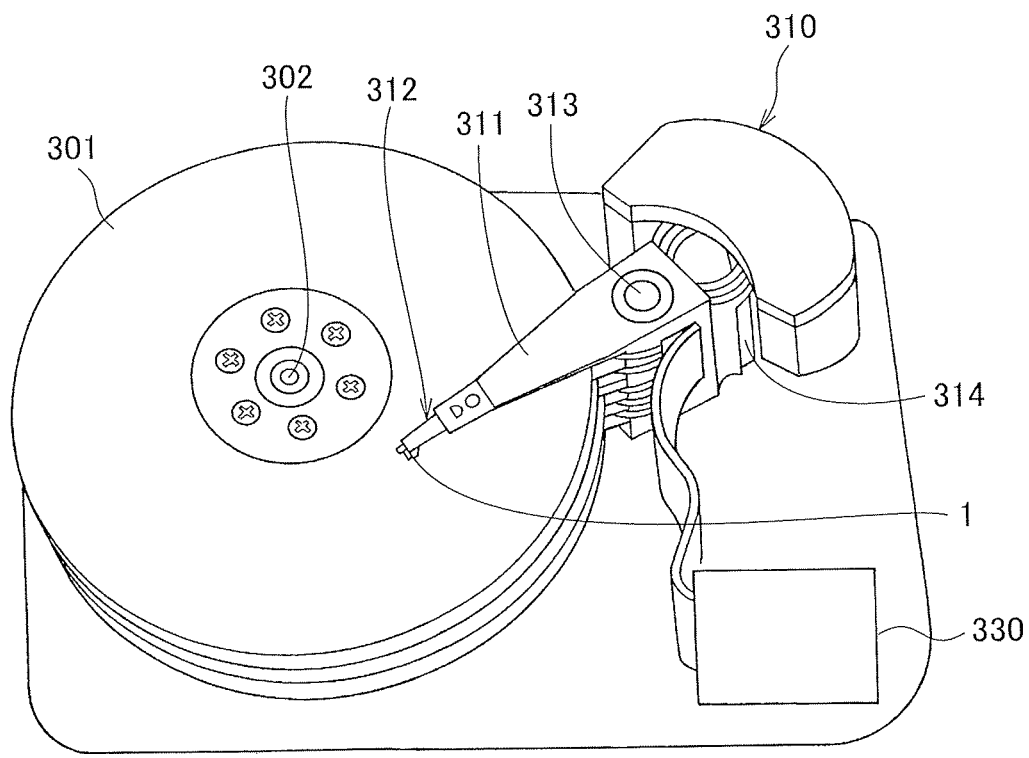
FIG. 1 is a perspective view schematically showing a magnetic recording device of an embodiment of the present invention.
Figure 2:
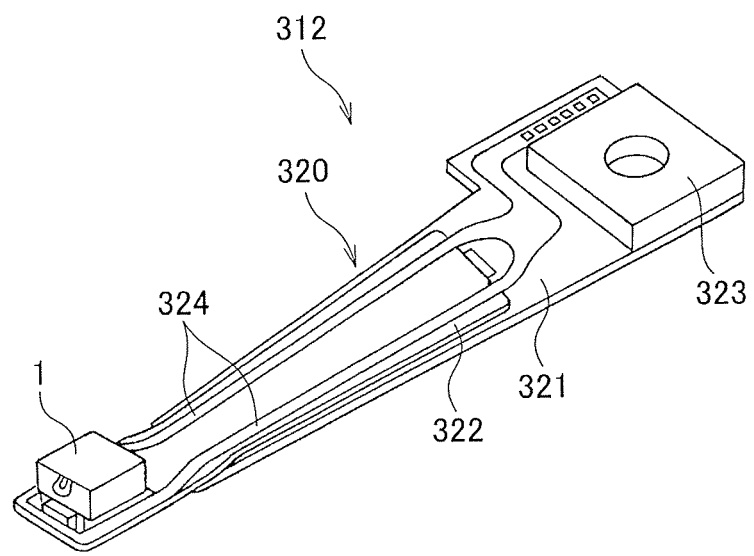
FIG. 2 is a perspective view schematically showing a head gimbal assembly (HGA) of an embodiment of the present invention.
Figure 3:
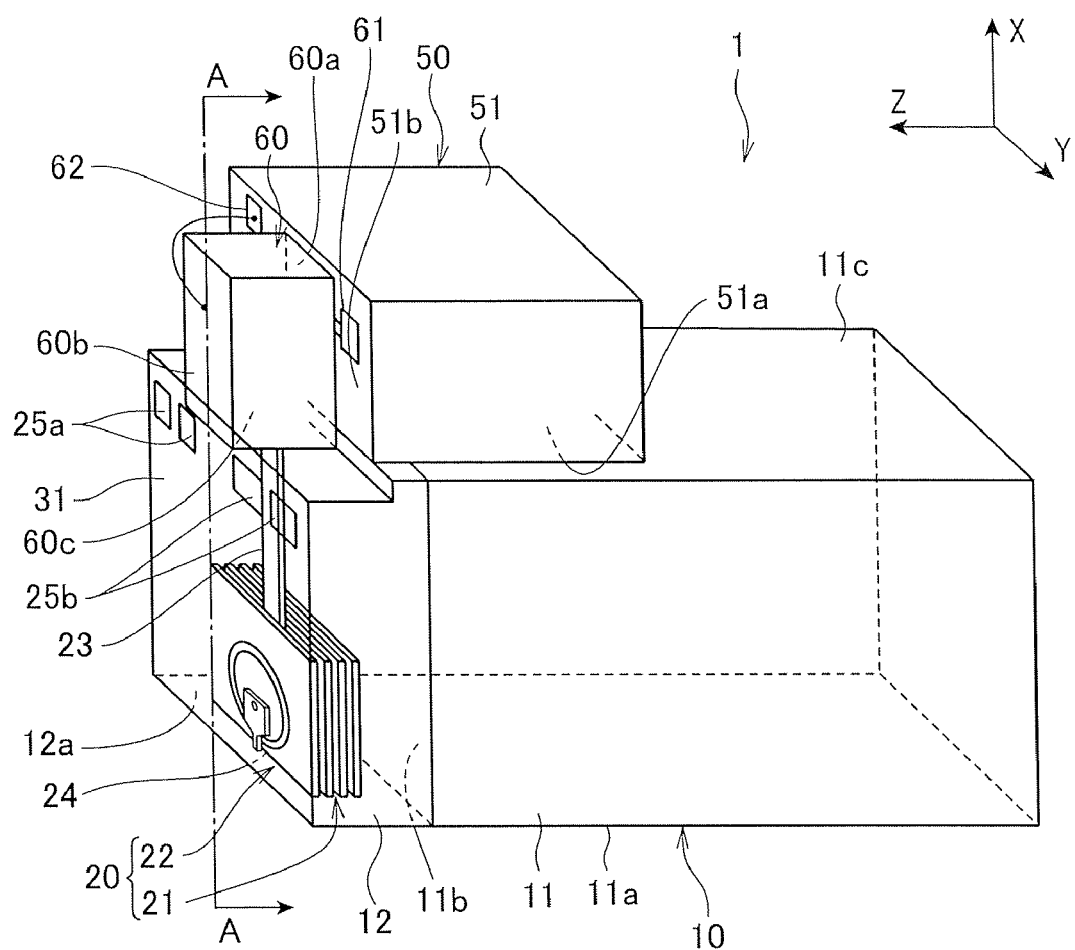
FIG. 3 is a perspective view showing a thermally assisted magnetic recording head according to an embodiment of the present invention.

FIG. 1 is a perspective view schematically showing a magnetic recording device of the present embodiment. FIG. 2 is a perspective view schematically showing a head gimbal assembly (HGA) of the present embodiment. FIG. 3 is a perspective view showing a thermally assisted magnetic recording head according to the present embodiment.

As shown in FIG. 1, a magnetic disk device, which is a magnetic recording device according to the present embodiment includes a plurality of magnetic disks 301 that rotate about a rotational axis of a spindle motor 302, an assembly carriage device 310 provided with a plurality of drive arms 311, a head gimbal assembly (HGA) 312 attached to a front end of each drive arm 311 and having a thermally assisted magnetic recording head 1, which is a thin film magnetic head, according to the present embodiment, and a control circuit 330 that controls writing and reading operations of the thermally assisted magnetic recording head 1 according to the present embodiment and that controls a light emission operation of a laser diode, which is a light source that generates laser light for the later-discussed thermally assisted magnetic recording.

In the present embodiment, the magnetic disks 301 are for perpendicular magnetic recording and have a configuration, in which a soft magnetic under layer, an intermediate layer and a magnetic recording layer (perpendicularly magnetized layer) are sequentially laminated on a disk substrate.

The assembly carriage device 310 is a device for positioning the thermally assisted magnetic recording head 1 on a track, which is formed on the magnetic disk 301 and on which recording bits are arrayed. In the assembly carriage device 310, the drive arms 311 are stacked in a direction along a pivot bearing shaft 313 and are angularly swingable by a voice coil motor (VCM) about the pivot bearing shaft 313.

The configuration of the magnetic disk device of the present embodiment is not limited to the above-described configuration but may include only a single set of the magnetic disk 301, the drive arm 311, the HGA 312 and the thermally assisted magnetic recording head 1.

In the HGA 312 shown in FIG. 2, a suspension 320 includes a load beam 321, a flexure 322 that is fixed to the load beam 321 and has elasticity, and a base plate 323 provided at a base of the load beam 321. In addition, a wiring member 324 formed from a lead conductor and a connection pads electrically connected to both sides of the lead conductor are provided on the flexure 322. The thermally assisted magnetic recording head 1 according to the present embodiment opposes a surface of the respective magnetic disk 301 with a predetermined space (flying height) and is fixed to the flexure 322 at the front end of the suspension 320. Further, an end of the wiring member 324 is electrically connected to a terminal electrode of the thermally assisted magnetic recording head 1 according to the present embodiment. The configuration of the suspension 320 in the present embodiment is also not limited to the above-described configuration but may include a head driving IC chip (not shown) attached to the middle of the suspension 320.

As shown in FIG. 3, the thermally assisted magnetic recording head 1 according to the present embodiment includes a slider 10 and a light source unit 50. The slider 10 is formed from ALTIC ($Al_2O_3$—TiC) or the like and includes a slider substrate 11 having an air bearing surface (ABS) 11a, which is a medium opposing surface, processed to obtain an appropriate flying height, and a head part 12 formed on an element formation surface 11b that is perpendicular to the ABS 11a.

Furthermore, the light source unit 50 is formed from ALTIC ($Al_2O_3$—TiC) or the like and includes a unit substrate 51 having a joining surface 51a, and a laser diode 60, which is a light source provided on the light source installation surface 51b that is perpendicular to the joining surface 51a.

The slider 10 and the light source unit 50 are joined with each other by bonding a back surface 11c of the slider substrate 11 and the joining surface 51a of the unit substrate 51. The back surface 11c of the slider substrate 11 means an end surface opposite from the ABS 11a of the slider substrate 11. The thermally assisted magnetic recording head 1 according to the present embodiment may have a configuration, in which the laser diode 60 is directly attached to the slider 10 without the light source unit 50.

The head part 12 formed on the element formation surface 11b of the slider substrate 11 includes a head element 20 that has an MR element 21 for reading out data from the magnetic disk 301 and an electromagnetic conversion element 22 for writing data on the magnetic disk 301, a waveguide 23 for guiding the laser light from the laser diode 60 provided on the light source unit 50 to the side of the medium opposing surface, a plasmon generator 24 that forms a near-field light generating optical system with the waveguide 23, a passivation layer 31 formed on the element formation surface 11b to cover the MR element 21, the electromagnetic conversion element 22, the waveguide 23 and the plasmon generator 24, a pair of first terminal electrodes 25a that are exposed from the upper surface of the passivation layer 31 and that are electrically connected to the MR element 21, and a pair of second terminal electrodes 25b that are exposed from the upper surface of the passivation layer 31 and that are electrically connected to the electromagnetic conversion element 22. The first and second terminal electrodes 25a and 25b are electrically connected to the connection pad of the wiring member 324 provided to the flexure 322 (FIG. 2).

Ends of the MR element 21, the electromagnetic conversion element 22 and the plasmon generator 24 reach a head part end surface 12a, which is the medium opposing surface of the head part 12. The head part end surface 12a and the ABS 11a form the entire medium opposing surface for the thermally assisted magnetic recording head 1 according to the present embodiment.

During the actual writing and reading of data, the thermally assisted magnetic recording head 1 hydro-dynamically flies on the surface of the rotating magnetic disk 301 with a predetermined flying height. At this time, the end surfaces of the MR element 21 and the electromagnetic conversion element 22 oppose the surface of the magnetic recording layer of the magnetic disk 301 with an appropriate magnetic spacing. In this state, the MR element 21 reads data by sensing a data signal magnetic field from the magnetic recording layer, and the electromagnetic conversion element 22 writes data by applying the data signal magnetic field to the magnetic recording layer.

At the time of writing data, the laser light that propagates from the laser diode 60 of the light source unit 50 through the waveguide 23 is coupled with the plasmon generator 24 in a surface plasmon mode and excites a surface plasmon at the plasmon generator 24. This surface plasmon propagates along the later-discussed propagation edge provided at the plasmon generator 24 towards the head part end surface 12a so that the near-field light is generated at the end of the plasmon generator 24 on the side of the head part end surface 12a. This near-field light heats a part of the magnetic recording layer of the magnetic disk 301 as it reaches the surface of the magnetic disk 301. As a result, anisotropic magnetic field (coercive force) at that part decreases to a value at which the writing becomes possible. Thermally assisted magnetic recording can be achieved by applying a writing magnetic field to the part where the anisotropic magnetic field has decreased.

Figure 4:
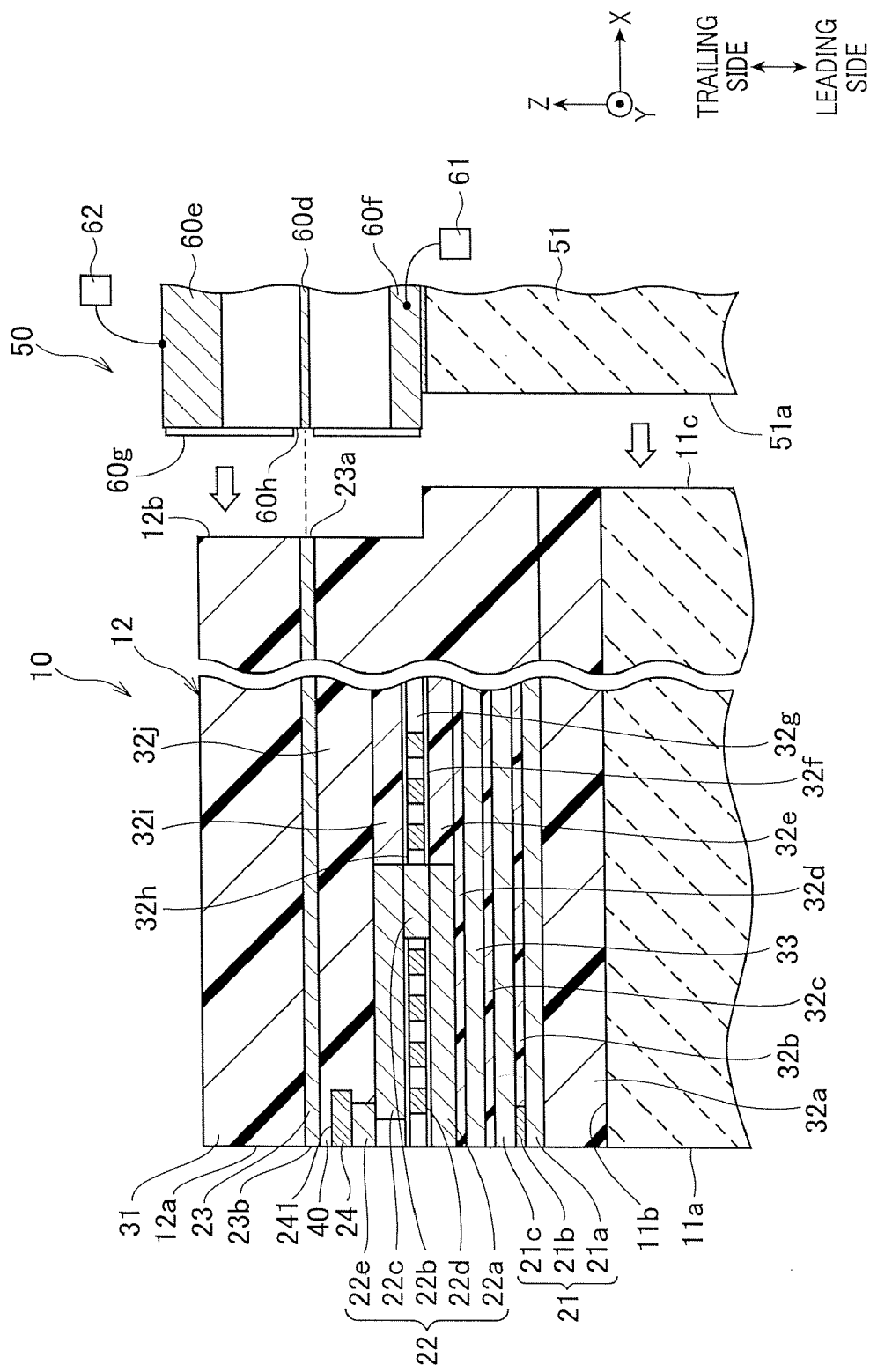
FIG. 4 is a cross-sectional view from an A-A line (XZ plane) in FIG. 3 that schematically shows a configuration of a main part of the thermally assisted magnetic recording head according to an embodiment of the present invention.

FIG. 4 is a cross-sectional view from an A-A line (XZ plane) in FIG. 3 that schematically shows a configuration the thermally assisted magnetic recording head 1 according to the present embodiment.

As illustrated in FIG. 4, the MR element 21 has a lower part shield layer 21a formed on a first insulation layer 32a on an element forming surface 11b of the slider substrate 11, an MR multilayer body 21b formed on the lower part shield layer 21a, and an upper part shield layer 21c formed on the MR multilayer body 21b. A second insulating layer 32b is provided between the lower part shield layer 21a and the upper part shield layer 21c in the periphery of the MR multilayer body 21b. The lower part shield layer 21a and the upper part shield layer 21c prevent the MR multilayer body 21b from being affected by external magnetic fields which are noise.

The lower shield layer 21b and the upper shield layer 21c are magnetic layers with a thickness of approximately 0.5-3 μm formed by a frame plating method or a spattering method, for example, and are formed by a soft magnetic material, such as NiFe (Permalloy), FeSiAl (Sendust), CoFeNi, CoFe, FeN, FeZrN, CoZrTaCr or the like, or a multilayer formed by these materials.

The MR multilayer 21b is a magnetically sensitive part that senses the signal magnetic field using the MR effect and may be any of a current-in-plane giant magnetoresistive (CIP-GMR) multilayer that uses a current-in-plane giant magnetoresistive effect, a current-perpendicular-to-plane giant magnetoresistive (CPP-GMR) multilayer that uses a current-perpendicular-to-plane giant magnetoresistive effect, and a tunnel-magnetoresistive (TMR) multilayer that uses a tunnel magnetoresistive effect. If the MR multilayer 21b is a CPP-GMR multilayer or a TMR multilayer, the lower shield layer 21a and the upper shield layer 21c function as electrodes also. On the other hand, if the MR multilayer 21b is a CIP-GMR multilayer, insulation layers are provided between the MR multilayer 21b and each of the lower shield layer 21a and the upper shield layer 21c. Moreover, an MR lead layer that is electrically connected to the MR multilayer 21b is provided.

If the MR multilayer 21b is a TMR multilayer, the MR multilayer 21b has a configuration in which the following are sequentially laminated: an antiferromagnetic layer of IrMn, PtMn, NiMn, RuRhMn or the like having a thickness of approximately 5-15 nm; a magnetization pinned layer that has a configuration in which two ferromagnetic layers of CoFe or the like sandwich a nonmagnetic metal layer of Ru or the like and in which a magnetization direction is pinned by the antiferromagnetic layer; a tunnel barrier layer of a non-magnetic dielectric material in which a metal film of Al, AlCu or the like having a thickness of 0.5-1 nm is oxidized by oxygen introduced in a vacuum device or by natural oxidation; and a magnetization free layer that is formed by a layer of CoFe or the like having a thickness of approximately 1 nm and a layer of NiFe or the like having a thickness of approximately 3-4 nm, which are ferromagnetic materials, and that achieves tunnel exchange coupling with the magnetization pinned layer through the tunnel barrier layer.

The head part 12 in this embodiment includes a third insulation layer 32c provided on the upper part shield layer 21c, an inter-element shield layer 33 provided on the third insulation layer 32c, and a fourth insulation layer 32d provided on the inter-element shield layer 33. The inter-element shield layer 33 may be formed from a soft magnetic material, and has a function that shields the MR element 21 from the magnetic field generated by the electromagnetic transducer element 22 provided on the fourth insulation layer 32d. The third insulation layer 32c and the inter-element shield layer 33 may be omitted.

The electromagnetic transducer element 22 is for perpendicular magnetic recording, and includes a lower part yoke layer 22a provided on the fourth insulation layer 32d, a linking layer 22b provided on the lower part yoke layer 22a in a position separated in the X-axis direction from the head part end surface 12a, an upper part yoke layer 22c provided on the linking layer 22b, a writing coil 22d with a spiral structure wound around the linking layer 22b so as to pass through at least the lower part yoke layer 22a and the upper part yoke layer 22c each turn, and a pole 22e provided on the upper part yoke layer 22c that reaches the head part end surface 12a so as to form a portion of the head part end surface 12a.

The head part 12 in the present embodiment includes a fifth insulation layer 32e provided in the area around the lower part yoke layer 22a on the fourth insulation layer 32d, a sixth insulation layer 32f provided on the lower part yoke layer 22a and the fifth insulation layer 32e, a seventh insulation layer 32g provided in the area around the linking layer 22b as well as between windings of the writing coil 22d and surrounding area thereof, an eighth insulation layer 32h provided on the writing coil 22d and the seventh insulation layer 32g, a ninth insulation layer 32i provided in the area around the upper part yoke layer 22c on the eighth insulation layer 32h, and a 10th insulation layer 32j provided in the area around the pole 22e on the upper part yoke layer 22c and the ninth insulation layer 32i.

In the head part 12 in the present embodiment, the lower part yoke layer 22a, linking layer 22b, upper part yoke layer 22c, and pole 22e form a magnetic guide path that allows the magnetic flux corresponding to the magnetic field generated by the writing coil 22d to pass through, and guides the magnetic flux to the magnetic recording layer (perpendicular magnetization layer) of the magnetic disk 301. The furthest trailing side of the end surface 220 of the pole 22e that forms a part of the head part end surface 12a is the point that generates the writing magnetic field.

The pole 22e is preferably formed from a soft magnetic material having a higher saturation magnetic flux density than the upper part yoke layer 22c, and is formed, for example, from a soft magnetic material, such as FeNi, FeCo, FeCoNi, FeN, FeZrN or the like, which are ferroalloy materials having Fe as a main component. The thickness in the Z direction of the pole 22e can be set from 0.1 to 0.8 μm.

Furthermore, the width in the Y direction of the pole 22e is preferably from 0.2 to 0.3 μm. If the width in the Y direction of the pole 22e is within the aforementioned range, a magnetic field having a writable intensity can be appropriately applied to the heating spot of the magnetic disk 301 that is heated by the plasmon generator 24.

The end surface on the head part end surface 12a side of the upper part yoke layer 22c does not extend to the head part end surface 12a, and is positioned at a location recessed from the head part end surface 12a by a predetermined distance toward the head part back end surface 12b side in the X direction. Thereby, magnetic flux can be concentrated at the pole 22e, and the intensity of the magnetic field generated from the pole 22e can be strengthened.

The writing coil 22d is formed from a conductive material, such as Cu (copper) or the like. The writing coil 22d is a single layer in the present embodiment, but can also be two or more layers, and can be a helical coil arranged such that the upper part yoke layer 22c is interposed therebetween. Furthermore, the number of windings of the writing coil 22d is not particularly restricted, and can be set from 2 to 7 turns, for example.

The lower yoke layer 22a is formed on a forth insulation layer 32d formed of an insulation material, such as $Al_2O_3$ (alumina) and functions as a waveguide that guides a magnetic flux that returns from a soft magnetic under layer provided under the magnetic recording layer (perpendicular magnetization layer) of the magnetic disk 301. The lower yoke layer 22a is formed by a soft magnetic material and has a thickness of approximately 0.5-5 μm, for example.

The waveguide 23 and the plasmon generator 24 are provided above the pole 22e and form an optical system for generating near-field light in the head part 12. The waveguide 23 is in parallel with the element formation surface 11b and extends from a rear end surface 23a that forms a part of a head part rear end surface 12b to the end surface 23b that forms a part of the head part end surface 12a. In addition, a part of the lower surface (side surface) of the waveguide 23 and a part of the upper surface of the plasmon generator 24 (including the projection part 241) oppose each other with a predetermined gap. A part that is sandwiched between those parts forms a buffer portion 40 that has a lower refractive index than the refractive index of the waveguide 23.

The buffer portion 40 functions to couple the laser light that propagates through the waveguide 23 to the plasmon generator 24 in the surface plasmon mode. The buffer portion 40 may be a part of a tenth insulation layer 32j that is a part of the passivation layer 31 or may be another layer provided separately from the tenth insulation layer 32j.

The plasmon generator 24 is provided at a position between the waveguide 23 and the pole 22e. With the thermally-assisted magnetic recording head 1 according to the present embodiment, the plasmon generator 24 is provided closer to the trailing side than the pole 22e. The specific structures of the pole 22e, waveguide 23, and plasmon generator 24 are described later.

As shown in FIG. 4, the light source unit 50 includes the unit substrate 51, the laser diode 60 provided on the light source installation surface 51b of the unit substrate 51, a first drive terminal electrode 61 electrically connected to an electrode that forms a lower surface 60a of the laser diode 60, and a second drive terminal electrode 62 electrically connected to an electrode that forms an upper surface 60b of the laser diode 60. The first and second drive terminal electrodes 61 and 62 are electrically connected to the connection pads of the wiring member 324 provided at the flexure 322 (FIG. 2). When a predetermined voltage is applied to the laser diode 60 via the first and second drive terminal electrodes 61 and 62, laser light is emitted from an emission center located on an emission surface 60c of the laser diode 60. In the head structure shown in FIG. 4, an oscillation direction of the electric field of laser light that the laser diode 60 generates is preferably perpendicular (Z axis direction) to a lamination layer plane of an active layer 60d. That is, it is preferable that the laser light which the laser diode 60 generates is a TM-mode polarized light. As a result, the laser light that propagates through the waveguide 23 can be coupled to the plasmon generator 24 in the surface plasmon mode through the buffer portion 40.

For the laser diode 60, InP-type, GaAs-type, and GaN-type diodes etc. may be used that are generally used for communication, optical disk storage, material analysis or the like. The wavelength $\lambda_L$ for the emitted laser light may be in a range of 375 nm-1.7 μm, for example.

More specifically, an InGaAsP/InP4 quaternary laser diode, of which the available wavelength region is considered to be 1.2-1.67 μm, for example, may be used. The laser diode 60 has a multilayer structure that includes the upper electrode 60e, the active layer 60d and the lower electrode 60f. Reflection layers for exciting the oscillation by total reflection are formed on cleavage surfaces of this multilayer structure. In a reflection layer 60g, an opening is provided at a position of the active layer 60d that includes the emission center 60h. A thickness $T_{LA}$ of the laser diode 60 is approximately 60-200 μm, for example.

A power source in the magnetic disk device may be used for driving the laser diode 60. Magnetic disk devices normally have a power source of approximately 2 V, for example, which has a sufficient voltage for operating the laser oscillation. In addition, power consumption of the laser diode 60 is approximately several tens of mW, for example, which can be sufficiently covered by the power source in the magnetic disk device. By applying a predetermined voltage by such a power source between the first drive terminal electrode 61 that is electrically connected to the lower electrode 60f and the second drive terminal electrode 62 that is electrically connected to the upper electrode 60e, and by oscillating the laser diode 60, the laser light is emitted from the opening that includes the emission center 60h in the reflection layer 60g. The laser diode 60 and the first and second drive terminal electrodes 61 and 62 are not limited to the above-discussed embodiment. For example, the electrodes may be turned upside down in the laser diode 60, and the upper electrode 60e may be bonded to the light source installation surface 51b of the unit substrate 51. Furthermore, a laser diode may be provided on the element formation surface 11b of the thermally assisted magnetic recording head 1, and such a laser diode and the waveguide 23 may be optically connected. Moreover, an emission center of a laser diode provided in the magnetic disk device and the rear end surface 23a of the waveguide 23 may be connected by an optical fiber or the like, for example, without providing the laser diode 60 in the thermally assisted magnetic recording head 1.

The sizes of the slider 10 and the light source unit 50 may be arbitrary. For example, the slider 10 may be a femto slider, which has a width of 700 μm in the track width direction (Y axis direction), a length of 850 μm (in Z axis direction) and a thickness of 230 μm (in X axis direction). In this case, the light source unit 50 may be a size slightly smaller than the slider, which may have a width of 425 μm in the track width direction, a length of 300 μm and a thickness of 300 μm.

By connecting the above-described light source unit 50 and slider 10, the thermally assisted magnetic recording head 1 is configured. For this connection, the contact surface 51a of the unit substrate 51 and the rear surface 11c of the slider substrate 11 are in contact. At this time, the unit substrate 51 and the slider substrate 11 are positioned so that the laser light generated from the laser diode 60 enters the rear end surface 23a of the waveguide 23 that is opposite from the ABS 11a.

Figure 5A:
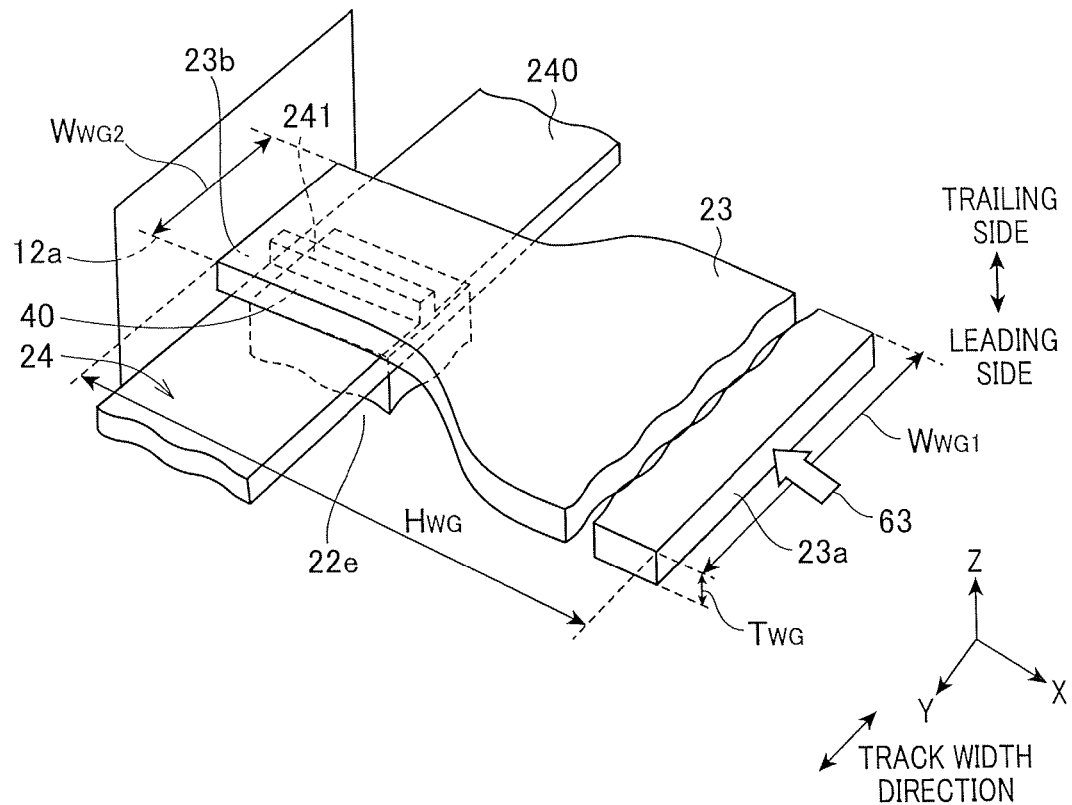
FIG. 5A is a perspective view schematically illustrating a configuration of a waveguide, plasmon generator, and pole for the thermally-assisted magnetic recording head according to one embodiment of the present invention.
Figure 5B:
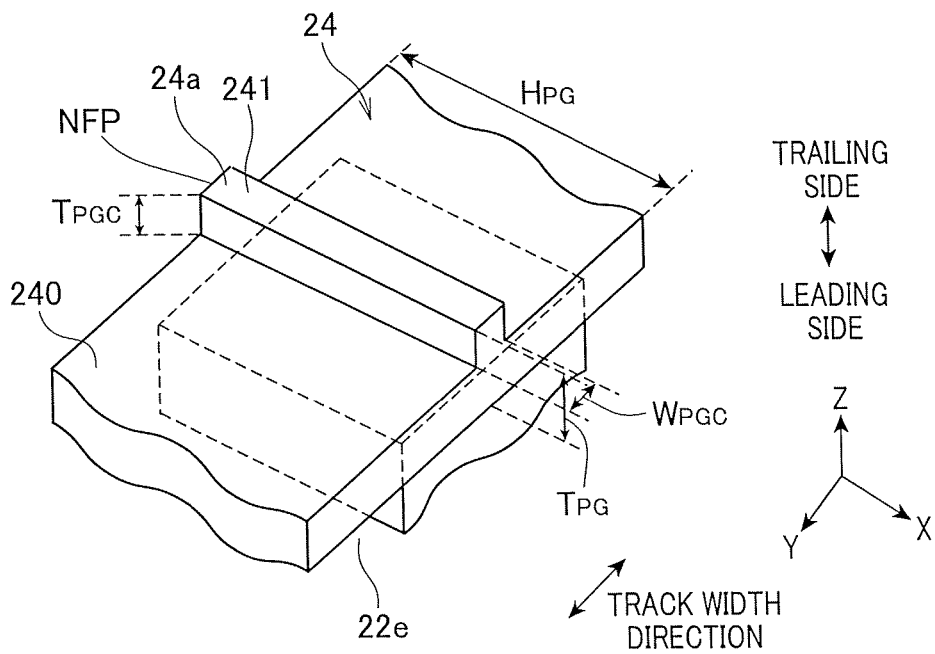
FIG. 5B is a perspective view schematically illustrating a configuration where the waveguide has been removed from the thermally-assisted magnetic recording head illustrated in FIG. 5A.

FIG. 5A is a perspective view schematically illustrating a configuration of the waveguide 23, the plasmon generator 24 and the pole 22e for the thermally assisted magnetic recording head 1 according to the present embodiment. FIG. 5B is a perspective view schematically illustrating a configuration where the waveguide 23 has been removed from the thermally-assisted magnetic recording head illustrated in FIG. 5A. In FIGS. 5A and 5B, the head part end surface 12a that includes positions from which the writing magnetic field and the near-field light are irradiated to the magnetic recording medium is positioned on the left side of the drawing.

As shown in FIG. 5A, the thermally assisted magnetic recording head 1 according to the present embodiment includes the waveguide 23 for propagating the laser light 63 for generating the near-field light, and the plasmon generator 24 having the projection part 241 that propagates the surface plasmon generated by the laser light (waveguide light) 63.

Figure 7:
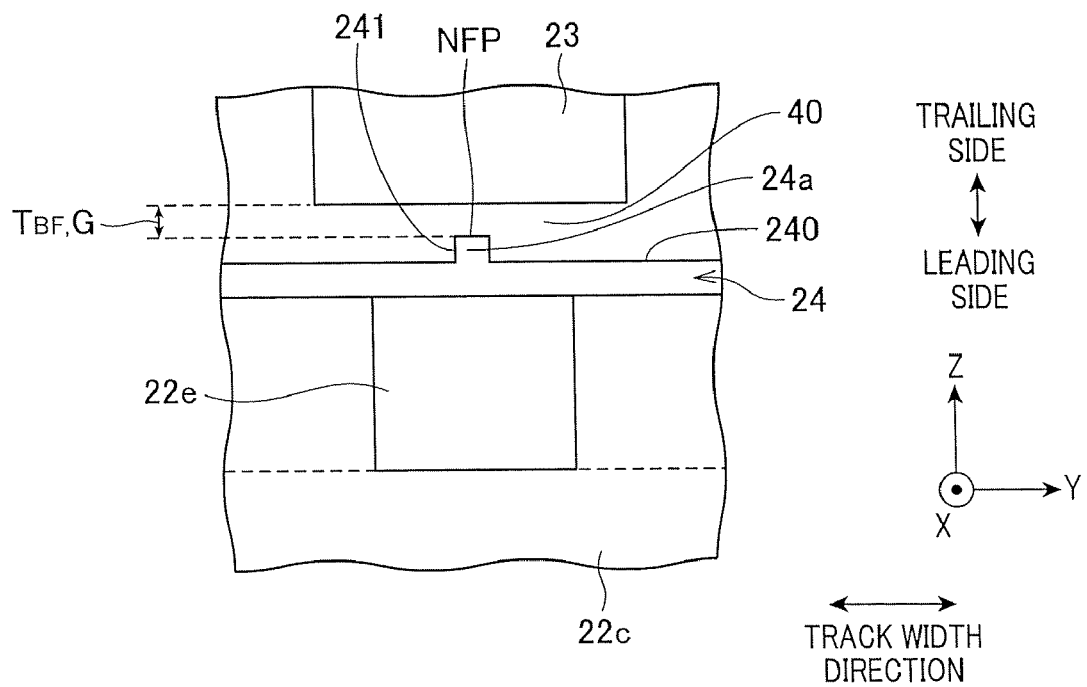
FIG. 7 is a plan view illustrating a shape of the waveguide, plasmon generator and electromagnetic transducer element on or near a head part end surface of a thermally-assisted magnetic recording head according to one embodiment of the present invention.

The plasmon generator 24 includes the near-field light generating end surface 24a that extends to the head part end surface 12a (see FIG. 7). In addition, the part sandwiched by a part of the side surface of the waveguide 23 and a part of the upper surface (side surface) of the plasmon generator 24 including the projection part 241 form the buffer portion 40. That is, the projection part 241 is surrounded by the buffer portion 40. This buffer portion 40 couples the laser light (waveguide light) 63 to the plasmon generator 24 in the surface plasmon mode. In addition, the projection part 241 propagates the surface plasmon excited by the laser light (waveguide light) 63 to the near-field light generating end surface 24a.

The side surfaces of the waveguide 23 include end surfaces, excluding the end surface 23b that forms a part of the head side end surface 12a and the rear end surface 23a opposite from the end surface 23b. The side surfaces of the waveguide 23 totally reflect the laser light (waveguide light) 63 that propagates in the waveguide 23, which corresponds to a core. In the present embodiment, the side surface 23c of the waveguide 23, part of which contacts the buffer portion 40, is the lower surface of the waveguide 23.

More specifically, the laser light (waveguide light) 63 that has advanced to the vicinity of the buffer portion 40 induces the surface plasmon mode at the projection part 241 of the plasmon generator 24 as it is coupled to the optical structure formed by the waveguide 23 having a predetermined refractive index $n_{WG}$, the buffer portion 40 having a predetermined refractive index $n_{BF}$, and the plasmon generator 24 made of a conductive material, such as metal. That is, the laser light (waveguide light) 63 is coupled to the plasmon generator 24 in the surface plasmon mode. This induction of the surface plasmon mode is achieved by setting the refractive index $n_{BF}$ of the buffer portion 40 to be smaller than the refractive index $n_{WG}$ of the waveguide 23 ($n_{BF}<n_{WG}$). Actually, evanescent light is excited in the buffer portion 40 based on the condition of the optical interface between the waveguide 23, which is the core, and the buffer portion 40. Then, the surface plasmon mode is induced as the evanescent light and a fluctuation of charges excited at the surface (projection part 241) of the plasmon generator 24 are coupled, and the surface plasmon 70 is excited (see FIG. 8). Here, the surface plasmon 70 is easily excited at the projection part 241, because the projection part 241 is located closest to the waveguide and because the electric field is easily focused as the projection part 241 has extremely small width in the Y axis direction.

The gap G between the lower surface of the waveguide 23 (surface opposing the plasmon generator 24) and the upper surface of the projection part 241 of the plasmon generator 24 (surface opposing the waveguide 23) (refer to FIG. 7) is preferably from 15 to 40 nm, and more preferably from 25 to 30 nm. If the gap G is within the aforementioned range, the light density can be increased, and the light spot diameter of the near-field light irradiated onto the magnetic disk 301 can be made smaller.

As illustrated in FIG. 5B, the plasmon generator 24 includes a flat plate part 240 that partly contacts the upper surface of the pole 22e, and the projection part 241 that projects from the flat plate part 240 to the waveguide 23 side. The end surface that becomes a part of the head part end surface 12a forms a near-field light generating end surface 24a.

As is made clear in FIG. 5A and FIG. 5B, the projection part 241 opposes the waveguide 23 via a buffer portion 40, and extends to the near-field light generating end surface 24a. Thereby, the projection part 241 can realize a function of propagating the surface plasmon excited by the laser light (waveguide light) that propagates through the waveguide 23. In other words, the plasmon generator 24 is coupled to the waveguide light in surface plasmon mode, and propagates the surface plasmon on the projection part 241. As a result, near-field light is generated from the near-field light generating portion NFP on the near-field light generating end surface 24a.

The protrusion height $T_{PGC}$ of the projection part 241 is preferably from 20 to 30 nm. Further, the width $W_{PGC}$ on the near-field light generating end surface 24a in the Y direction of the projection part 241 is smaller than the wavelength of the laser light (waveguide light) 63, and is preferably from 15 to 30 nm. Furthermore, the height $T_{PG}$ from the lower end (surface that contacts the upper surface of the pole 22e) of the flat plate part 240 to the upper end (upper end surface) of the projection part 241 when viewed from the air bearing surface side so that the waveguide 23 is positioned closer to the trailing side than the plasmon generator 24, is preferably from 45 to 75 nm, but approximately 60 nm is more preferable. Moreover, the length $H_{PG}$ of the plasmon generator 24 in the X direction is preferably from 1.0 to 1.4 µm, but approximately 1.2 µm is more preferable. Because the plasmon generator 24 and the projection part 241 have the aforementioned size, the light spot diameter of the near-field light irradiated onto the magnetic disk 301 can be made smaller.

Figure 6:
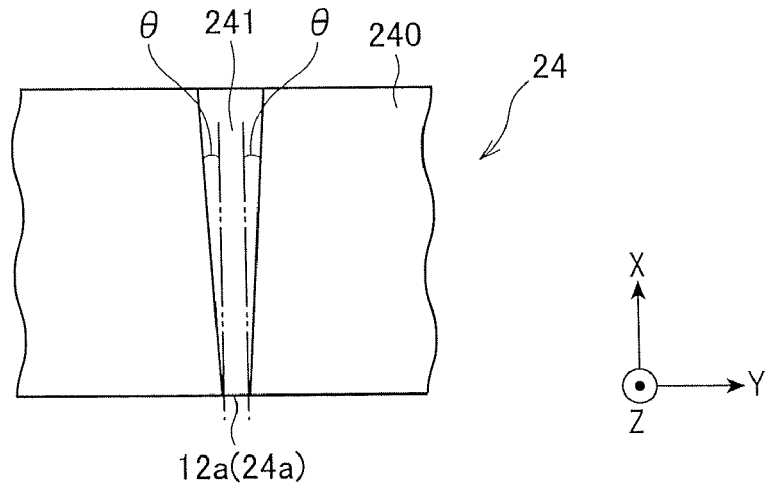
FIG. 6 is a top surface view illustrating another configuration example of the plasmon generator according to one embodiment of the present invention.

With the present embodiment, the shape of the upper surface of the projection part 241 is rectangular. However, as illustrated in FIG. 6, the shape of the upper surface of the projection part 241 can be trapezoidal, configured from a short side positioned on the head part end surface 12a, a long side positioned on the head part back end surface 12b side, and two oblique sides each connecting the end parts of the long and short sides, and the width in the Y direction gradually increases from the head part end surface 12a toward the head part back end surface 12b side. With this shape, the light density of the near-field light irradiated onto the magnetic disk 301 can be increased, and the light spot diameter can be made smaller. In this case, the angle θ formed by the X axis and each of the two oblique sides of the trapezoid shape of the upper surface of the projection part 241 is preferably less than 10°, more preferably from 1 to 3°, and approximately 2° is particularly preferred.

As illustrated in FIGS. 5A and 5B, a portion of the flat plate part 240 of the plasmon generator 24, which is made of a metal material, interfaces with the pole 22e, which is similarly made of a metal material. Thereby, the plasmon generator 24 is not in an electrically isolated state, and the negative effects caused by electrostatic discharge (ESD) are suppressed.

Furthermore, the flat plate part 240 can realize a function of causing the heat generated by the near-field light generating portion NFP at the near-field light generating end surface 24a of the plasmon generator 24 to escape from the near-field light generating portion NFP. As a result, excess temperature increase of the plasmon generator 24 is suppressed. This can contribute to the avoidance of a major drop in the light use efficiency of the plasmon generator 24 and unnecessary protrusion of the near-field light generating end surface 24a. Furthermore, the heat can be suppressed by escaping to the pole 22e side, and therefore degradation of the pole 22e due to heat can be suppressed.

The length $H_{PG}$ (see FIG. 5B) in the height direction (X direction) of the plasmon generator 24 is preferably equal to or longer than the length of the pole 22e in this direction. If the length in the height direction (X direction) of the plasmon generator 24 is shorter than the length of the pole 22e, there is a risk that the laser light (waveguide light) that propagates through the waveguide 23 is lost by the existence of the pole 22e, and that the light intensity is reduced.

The plasmon generator 24 is preferably formed of a conductive material, such as a metal (e.g., Pd, Pt, Rh, Ir, Ru, Au, Ag, Cu or Al) or an alloy made of at least two types of these metals.

The waveguide 23 is provided on the +Z side (trailing side) of the plasmon generator 24. With such a configuration, the waveguide 23 can be separated from the pole 22e. As a result, a case can be avoided, in which the amount of light to be converted to the near-field light decreases as a part of the laser light (waveguide light) 63 is absorbed by the pole 22e formed by metal.

Regarding the shape of the waveguide 23, the width in the track width direction (Y axis direction) may be constant. However, the width of a part of the waveguide 23 on the side of the head part end surface 12a may be narrower in the track width direction (Y axis direction) as shown in FIG. 5A. The width $W_{WG1}$ in the track width direction (Y axis direction) at a part of the rear end surface 23a that is on the opposite side from the head part end surface 12a of the waveguide 23 is approximately 0.5-20 μm, for example. The width $W_{WG2}$ in the track width direction (Y axis direction) at the part on the side of the end surface 23b is approximately 0.3-100 μm, for example. The thickness $T_{WG}$ of the part on the side of the rear end surface 23a (in the Z axis direction) is approximately 0.1-4 μm, for example. The height (length) $H_{WG}$ (in the X axis direction) is approximately 10-300 μm, for example.

The side surfaces of the waveguide 23, that is, the upper surface, the lower surface and both side surfaces in the track width direction (Y axis direction) contact the passivation layer 31 (FIG. 4), except the part that contacts the buffer portion 40. The waveguide 23 is configured from a material formed by spattering or the like, that has a refractive index $n_{WG}$, which is higher than the refractive index $n_{OC}$ of the material forming the passivation layer 31. For example, if the wavelength $\lambda_L$ of the laser light is 600 nm, and if the passivation layer 31 is formed by SiO$_2$ (silicon dioxide; n=1.46), the waveguide 23 may be formed by Al$_2$O$_3$ (alumina; n=1.63). In addition, if the passivation layer 31 is formed by Al$_2$O$_3$ (n=1.63), the waveguide 23 may be formed by SiO$_x$N$_y$ (n=1.7~1.85), Ta$_2$O$_5$ (n=2.16), Nb$_2$O$_5$ (n=2.33), TiO (n=2.3~2.55) or TiO$_2$ (n=2.3~2.55). By forming the waveguide 23 with such materials, propagation loss of the laser light (waveguide light) 63 can be suppressed with excellent optical characteristics that the materials have themselves. Further, while the waveguide functions 23 as a core, the passivation layer 31 functions as a cladding, thereby establishing the condition for total reflection by the entire side surfaces. As a result, more laser light (waveguide light) 63 reaches the position of the buffer portion 40, and thus, the propagation efficiency of the waveguide 23 increases.

Further, the waveguide 23 may have a multilayer structure of dielectric materials and may have a configuration that the refractive index n increases in the upper layers. For example, such a multilayer structure may be established by sequentially laminating dielectric materials based on SiO$_x$N$_y$, as a composition ratio for X and Y is appropriately varied. The number of laminated layers may be 8-12, for example. As a result, if the laser light (waveguide light) 63 is linearly polarized light in the Z axis direction, the laser light (waveguide light) 63 can propagate to the side of the buffer portion 40 along the Z axis direction. At that time, by selecting the composition of each layer in the multilayer structure, the layer thickness and the number of layers, the desired propagative position for the laser light (waveguide light) 63 in the Z axis direction can be obtained.

The buffer portion 40 is formed by a dielectric material that has a lower refractive index $n_{BF}$ than the refractive index $n_{WG}$ of the waveguide 23. If the wavelength $\lambda_L$ of the laser light is 600 nm, and if the waveguide 23 is formed by Al$_2$O$_3$ (alumina; n=1.63), the buffer portion 40 may be formed by SiO$_2$ (silicon dioxide; n=1.46). In addition, if the waveguide 23 is formed by Ta$_2$O$_5$ (n=2.16), the buffer portion 40 may be formed by SiO$_2$ (n=1.46) or Al$_2$O$_3$ (n=1.63). In these cases, the buffer portion 40 may be configured as a part of the passivation layer 31 (FIG. 3), which is formed by SiO$_2$ (n=1.46) or Al$_2$O$_3$ (n=1.63) and functions as a cladding. Moreover, the length $L_{BF}$ (in the X axis direction) of the buffer portion 40, which is sandwiched by the side surface 23c of the waveguide 23 and the projection part 241, is preferably 0.5-5 μm and is preferably larger than the wavelength $\lambda_L$ of the laser light (waveguide light) 63. In such a case, the buffer portion 40 becomes a significantly larger area compared to the so-called "focal area" that is formed when the laser light is concentrated at the buffer portion 40 and the plasmon generator 24 for coupling in the surface plasmon mode. Therefore, coupling in the extremely stable surface plasmon mode becomes possible. The thickness $T_{BF}$ (in the Z axis direction) of the buffer portion 40 is preferably 10-200 nm. These length $L_{BF}$ and thickness $T_{BF}$ of the buffer portion 40 are important parameters for achieving appropriate excitation and propagation for the surface plasmon.

FIG. 7 is a plan view illustrating a shape of the waveguide 23, plasmon generator 24, and electromagnetic transducer element 22 on or near the head part end surface of a thermally-assisted magnetic recording head 1 according to the present embodiment.

As illustrated in FIG. 7, the pole 22e extends to the head part end surface 12a in the electromagnetic transducer element 22. Herein, the end surface 221 on the head part end surface 12a of the pole 22e has an approximately rectangular shape such as a rectangle, square, or a trapezoid or the like, for example.

On the head part end surface 12a, the plasmon generator 24 has a flat plate part 240 with a predetermined thickness that partly contacts the pole 22e. A top side NFP of the projection part 241 of the plasmon generator 24 is separated from the pole 22e and thereby can function as a near-field light emitting point.

Figure 8:
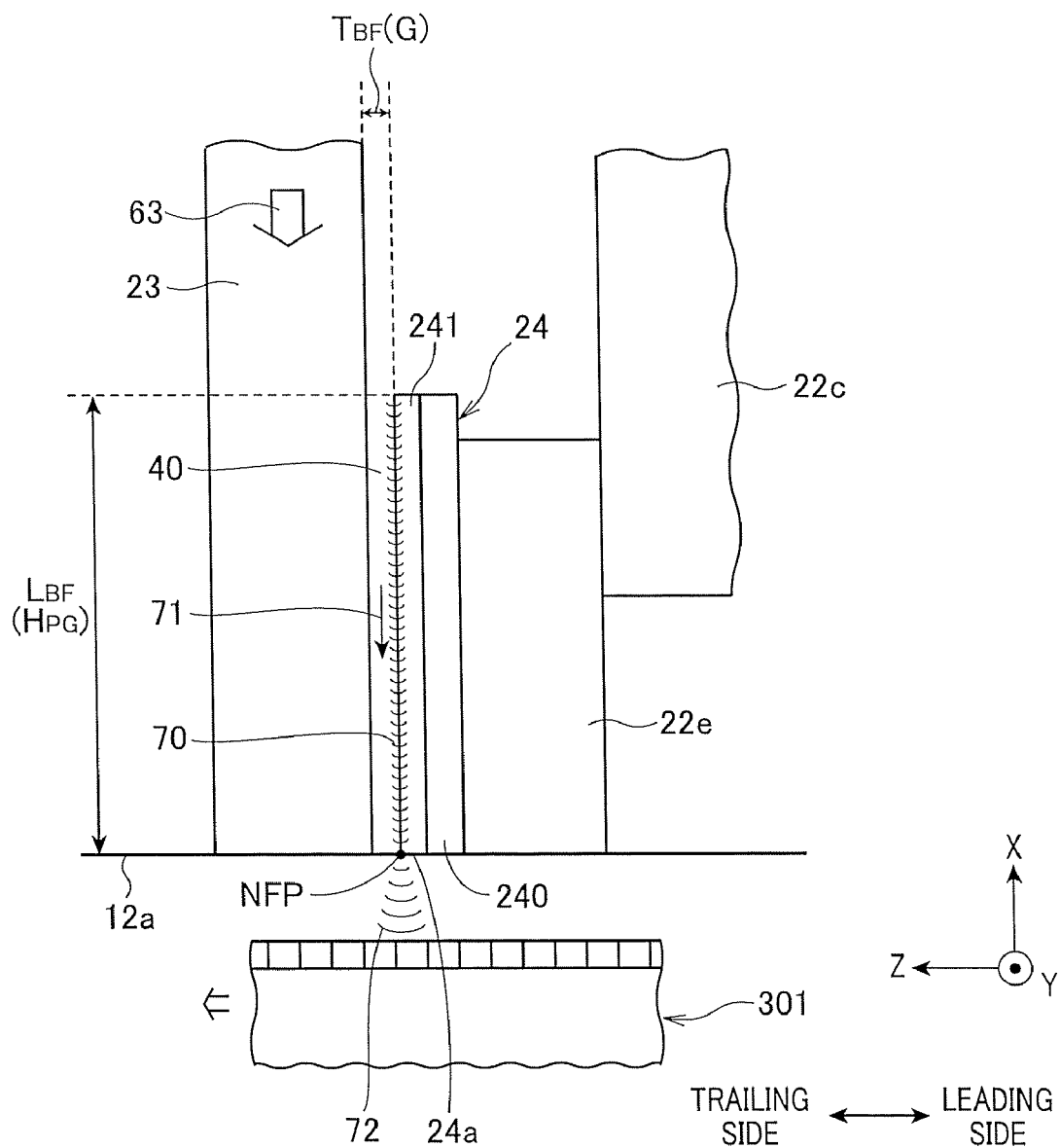
FIG. 8 is a schematic diagram for describing thermally-assisted magnetic recording using a surface plasmon mode in the thermally-assisted magnetic recording head according to one embodiment of the present invention.

Next, the function of the thermally-assisted magnetic recording head 1 according to the present embodiment having the aforementioned configuration is described. FIG. 8 is a schematic diagram for describing thermally-assisted magnetic recording using a surface plasmon mode in a thermally-assisted magnetic recording head 1 according to the present embodiment.

As illustrated in FIG. 8, when information is written to the magnetic recording layer of the magnetic disk 301 by the electromagnetic transducer element 22, first the laser light (waveguide light) 63 radiated from the laser diode 60 of the light source unit 50 propagates through the waveguide 23. Next, the laser light (waveguide light) 63 that has advanced to the vicinity of the buffer portion 40 couples to the optical configuration formed by the waveguide 23 having a refractive index $n_{WG}$, the buffer portion 40 having a refractive index $n_{BF}$, and the plasmon generator 24 formed of a conductive material such as a metal, and induces the surface plasmon mode on the projection part 241 of the plasmon generator 24. In other words, the laser light 63 is coupled to the plasmon generator 24 in the surface plasmon mode. Actually, from the optical interfacial state between the waveguide 23, which is a core, and the buffer portion 40, evanescent light is excited in the buffer portion 40. Next, the surface plasmon mode is induced and surface plasmon is excited by a form in which the evanescent light and a fluctuation on a charge excited on the metal surface (projection part 241) of the plasmon generator 24 are coupled with each other. Precisely, because the surface plasmon, which is the elementary excitation in this system, is coupled to the electromagnetic wave, it is a surface plasmon polariton that is excited. However, the surface plasmon polariton is abbreviated and simply referred to as surface plasmon hereinafter. This surface plasmon mode can be induced by setting the refractive index $n_{BF}$ of the buffer portion 40 to be smaller than the refractive index $n_{WG}$ of the waveguide 23 ($n_{BF} < n_{WG}$) and by appropriately selecting a length of the buffer portion 40 (in the X direction), that is the length $L_{BF}$ of the coupling part between the waveguide 23 and the plasmon generator 24 (length $H_{PC}$ of the plasmon generator 24 in the X direction), and the thickness $T_{BF}$ of the buffer portion 40 (in the Z direction) (the gap G between the waveguide 23 and the projection part 241; preferably from 15 to 40 nm and more preferably from 25 to 30 nm).

In the induced surface plasmon mode, the surface plasmon 70 is excited on the projection part 241 of the plasmon generator 24 and propagates on the projection part 241 along the direction of arrow 71. The projection part 241 is not in contact with the pole 22e, and therefore is not negatively affected by the pole 22e that has not been adjusted for efficiently exciting the surface plasmon. As a result, the surface plasmon intentionally propagates on the projection part 241.

As described above, when the surface plasmon 70 propagates in the direction of arrow 71 on the projection part 241, the surface plasmon 70, that is, the electric field is concentrated on the near-field light generating portion NFP on the near-field light generating end surface 24a, which is the destination of the projection part 241 that extends to the head part end surface 12a. As a result, near-field light 72 is generated from the near-field light generating portion NFP. The near-field light 72 is irradiated towards the magnetic recording layer of the magnetic disk 301, reaches the surface of the magnetic disk 301, and heats the magnetic recording layer part of the magnetic disk 301. Therefore, an anisotropic magnetic field (coercive force) of that part decreases to a value at which the writing can be performed, and writing is performed by the magnetic field applied to that part.

Herein, with the present embodiment, the plasmon generator 24 is positioned closer to the trailing side than the pole 22e and therefore the part where the writing magnetic field is applied directly below the pole 22e moves relatively and be heated by the near-field light. Therefore, after heating by the near-field light has occurred, a magnetic field is applied to the magnetic microparticles with unstable magnetization during the cooling process. Therefore, rapid magnetization reversal can occur in the magnetic domain adjacent to the magnetic disk 301 because of the magnetic field that was applied, and thus, the requirements for high recording density and sufficient S/N ratio can be satisfied.

Furthermore, because the plasmon generator 24 of the present embodiment includes the flat plate part 240 that contacts with the pole 22e and the projection part 241 that projects to the waveguide 23 side, the light density of the near-field light generated from the near-field light generating portion NFP of the projection part 241 and irradiated onto the magnetic disk 301 can be increased, and the light spot diameter can be reduced. Therefore, even higher recording density can be accommodated.

Moreover, heating due to the generation of near-field light 72 occurs in the vicinity of the near-field light generating portion NFP of the near-field light generating end surface 24a, but this heat escapes to the flat plate part 240 of the plasmon generator 24. As a result, excess temperature increase of the plasmon generator 24 is suppressed, and this can contribute to the avoidance of a major drop in the light use efficiency of the plasmon generator 24 and unnecessary protrusion of the near-field light generating end surface 24a. Moreover, the heat can be suppressed from escaping to the pole 22e side, and therefore, degradation and the like of the pole 22e due to the heat that escapes to the pole 22e side can also be suppressed.

The thermally-assisted magnetic recording head with the aforementioned configuration can be manufactured as described below.

FIGS. 9A-9E are schematic diagrams illustrating steps for forming the plasmon generator 24 of the thermally-assisted magnetic recording head 1 according to the present embodiment. All of the drawings (FIG. 9A-9E) are plan views illustrating a YZ plane as seen from the air bearing surface side.

Figure 9A:
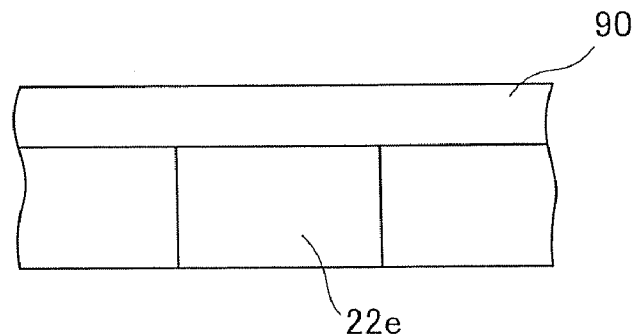
FIGS. 9A-9E are schematic diagrams illustrating steps for forming the plasmon generator and pole of the thermally-assisted magnetic recording head according to one embodiment of the present invention.

As illustrated in FIG. 9A, a metal layer 90 of a predetermined thickness (for example, approximately 60 nm) made of Au, an Au alloy or the like is formed using a sputtering method, for example, so as to cover the pole 22e formed from a magnetic material such as FeCo or the like and planarized using a polishing method such as chemical mechanical polishing (CMP). This metal layer 90 later becomes the plasmon generator 24.

Figure 9B:
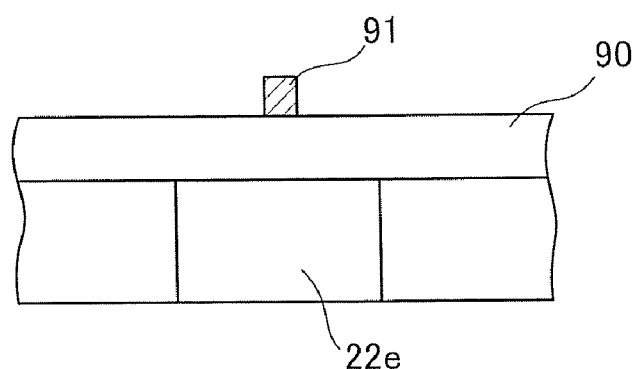

Next, as illustrated in FIG. 9B, a photoresist layer 91 is formed so as to cover the metal layer 90, and then patterned. The metal layer 90 below the portion of the photoresist layer 91 that remains after the patterning later becomes the projection part 241 of the plasmon generator 24, and the other areas become the flat plate part 240 of the plasmon generator 24.

Figure 9C:
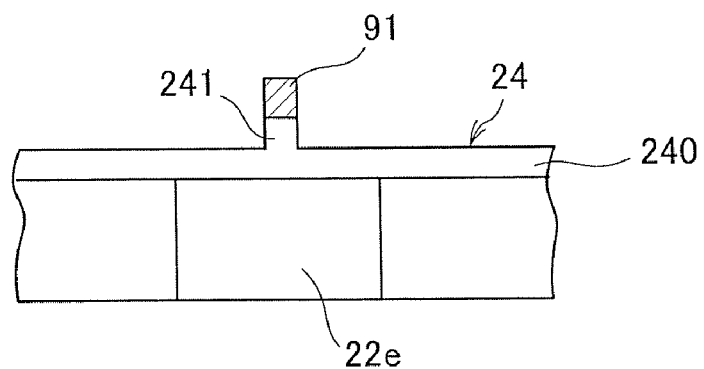

Next, as illustrated in FIG. 9C, etching is performed using a dry etching method, such as ion milling or the like, such that the remaining photoresist layer 91 becomes a mask and that the thickness of the metal layer 90 in the areas where the photoresist layer does not exist becomes a predetermined thickness (for example, approximately 30 nm). Thereby, the plasmon generator 24 is formed with the flat plate part 240 and the projection part 241.

Figure 9D:
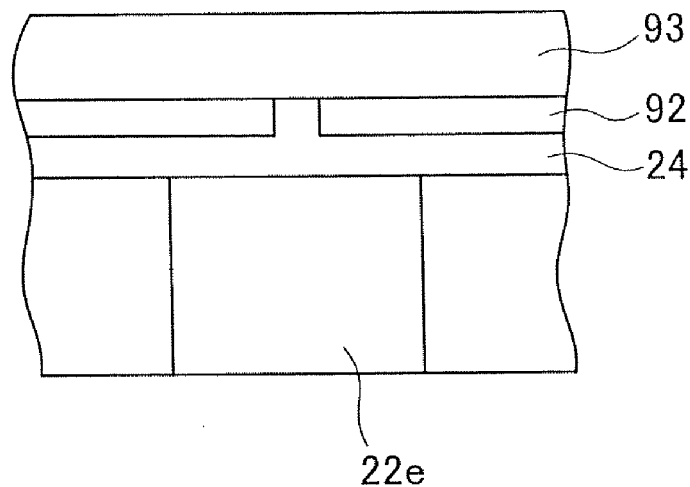

Thereafter, as illustrated in FIG. 9D, a protective layer 92 made of $Al_2O_3$ (alumina) or $SiO_2$ is formed so as to cover the plasmon generator 24 and the photoresist layer 91, and after lift-off, an insulation layer 93 made of $Al_2O_3$ (alumina) is formed using a sputtering method or the like so as to cover the protective layer 92. The insulation layer 93 later forms a gap, that is the buffer portion 40, between the plasmon generator 24 (projection part 241) and the waveguide 23. The thickness of the insulation layer 93 has an effect on the coupling efficiency of the laser light (waveguide light) 63 to the projection part 241 of the plasmon generator 24, and therefore the film thickness of the insulation layer 93 must be controlled to a suitable thickness.

Figure 9E:
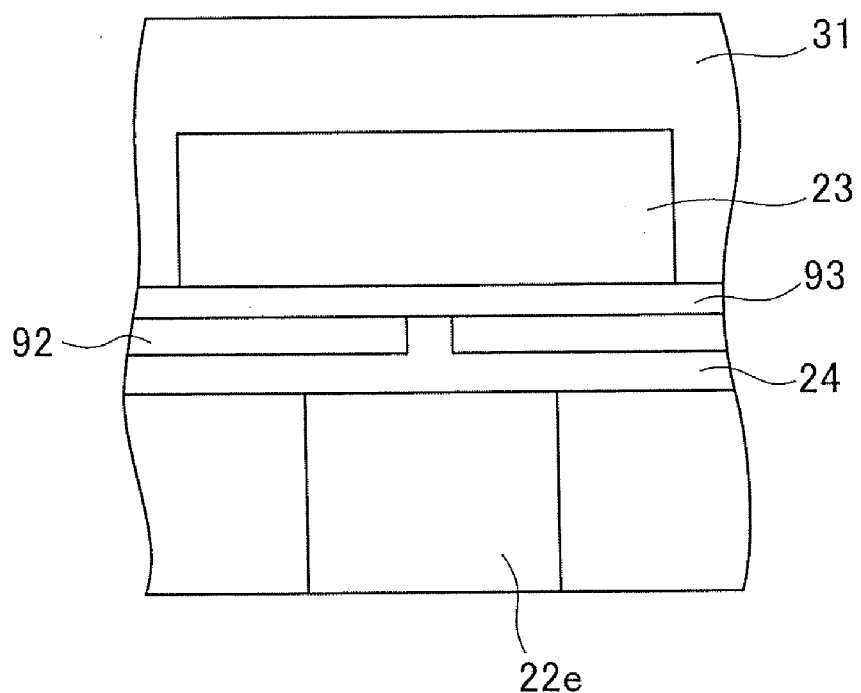

Finally, as illustrated in FIG. 9E, the head part 12 of the present embodiment can be manufactured by forming the waveguide 23 by forming and patterning a $TaO_X$ film on the insulation layer 93, and then forming a protective layer 31 made of $Al_2O_3$ (alumina) or $SiO_2$.

With the aforementioned manufacturing method, the gap G between the waveguide 23 and the plasmon generator 24 (projection part 241) can easily be controlled by controlling the film thickness of the insulation layer 93. Therefore, the thermally-assisted magnetic recording head 1 that can sufficiently reduce the light spot diameter of the near-field light that is irradiated onto the magnetic disk 301 can easily be manufactured.

The aforementioned embodiment is provided to aid in understanding the present invention, and is not provided to restrict the present invention. Therefore, each of the elements disclosed in the aforementioned embodiment also includes any design changes and equivalents thereof that belong to the technical scope of the present invention.

Figure 10:
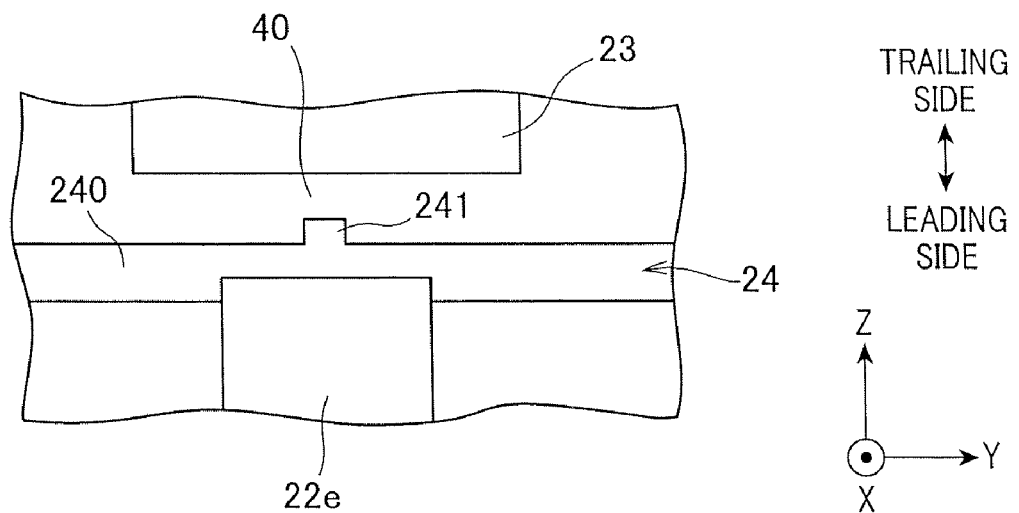
FIG. 10 is a plan view illustrating a shape of the waveguide, plasmon generator, and electromagnetic transducer element on or near a head part end surface of a thermally-assisted magnetic recording head according to another embodiment of the present invention.

In the aforementioned embodiment, the flat plate part 240 of the plasmon generator 24 is provided on the pole 22e, but the present invention is not restricted to this configuration. For example, as illustrated in FIG. 10, a configuration is also acceptable where a portion of the pole 22e is embedded into the bottom surface side of the flat plate part 240 of the plasmon generator 24. By using this configuration, the thickness of the flat plate part 240 of the plasmon generator 24 is increased, and the heat dispersing effect can be enhanced, while at the same time the light density of the near-field light irradiated onto the magnetic disk 301 can be increased and the light spot diameter can be made even smaller. Furthermore, the distance between the pole 22e and the near-field light generating portion NFP of the projection part 241 is reduced, and the magnetic field required for writing can be applied.

Figure 11:
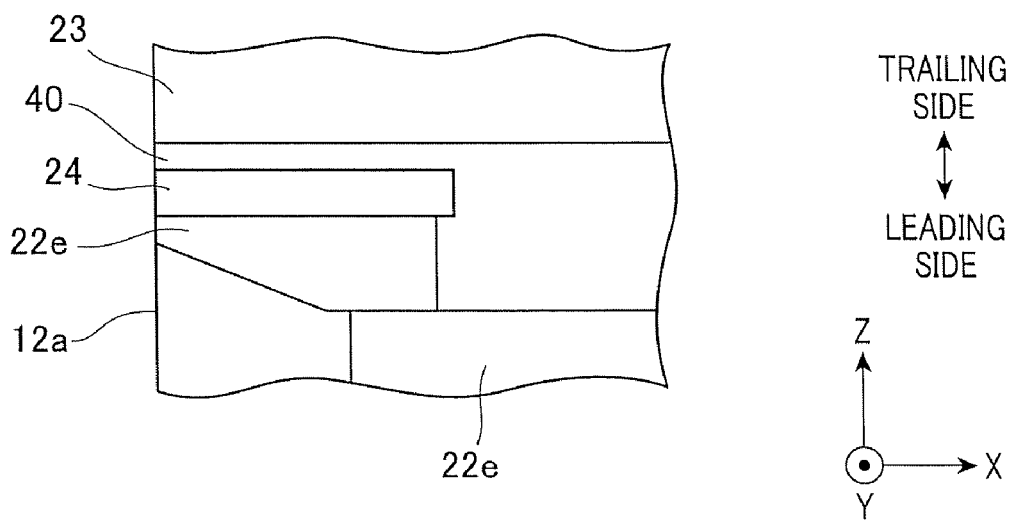
FIG. 11 is a cross-sectional view (XZ plane) illustrating a shape of the waveguide, plasmon generator, and electromagnetic transducer element on or near a head part end surface of a thermally-assisted magnetic recording head according to another embodiment of the present invention.

Furthermore, with the above-described embodiment, the pole 22e has approximately a rectangular solid shape, but the present invention is not restricted to this configuration. For example, as illustrated in FIG. 11, a configuration is also acceptable where at least a portion of the surface of the leading side of the pole 22e is sloped such that the projection area of the pole 22e gradually increases toward the X direction when viewed from the head part end surface 12a side. Thereby, the magnetic flux guided by the linking layer 22b (refer to FIG. 4), the upper part yoke layer 22c, and the pole 22e can be even further concentrated in the vicinity of the near-field light generating portion NFP.

Furthermore, with the aforementioned embodiment, when the projection part 241 projecting from the flat plate part 240 of the plasmon generator 24 is viewed from the head part end surface 12a side, the shape of the projection part 241 is rectangular, but the present invention is not restricted to this configuration, and the shape of the projection part 241 can be essentially a trapezoidal shape or essentially an inverted trapezoidal shape or the like when the projection part 241 is viewed from the head part end surface 12a side, and a shape is also acceptable where the angle of intersection between the flat plate part 240 and the side edge (side in the Z direction) of the projection part 241 is rounded when the projection part 241 is viewed from the head part end surface 12a side.

With the aforementioned embodiment, a part of the flat plate part 240 of the plasmon generator 24 contacts upper surface of the pole 22e. However, the present invention is not restricted to this configuration, and the lower surface of the flat plate part 240 of the plasmon generator 24 and the upper surface of the pole 22e can be separated by a predetermined distance, and in this case, an insulation layer made of $Al_2O_3$ (alumina) or the like can be interposed between the flat plate part 240 of the plasmon generator and the pole 22e.

EXAMPLES

The present invention is described in further detail by presenting experimental examples. However, the present invention is in no way restricted to the following experimental examples and the like.

Experimental Example 1

Simulation analysis experiments were performed as described below for the magnetic field intensity of the magnetic field generated by the pole in the thermally-assisted magnetic recording head, directly below (heating point) the near-field light generating portion NFP.

The simulation analysis experiments were performed using a three-dimensional finite-difference time-domain method (FDTD method) which is electromagnetic field analysis.

The thermally-assisted magnetic recording head of the present embodiment is the thermally-assisted magnetic recording head 1 illustrated in FIGS. 5A and 5B that implements a model where the pole 22e is formed from a FeCo alloy. Furthermore, in this model, the width in the Y direction of the pole 22e (track width direction) was 0.3 µm, and the end surface of the upper part yoke layer 22c on the head part end surface 12a was located at a position recessed by 0.2 µm in the X direction (height direction) from the head part end surface 12a. Furthermore, the number of windings in the writing coil 22d was 3, and the input current value was 40 mA.

Furthermore, with the extreme trailing side of the pole 22e (contact point between the plasmon generator 24 and the flat plate part 240) as seen from the ABS 11a as the origin, a magnetic field intensity corresponding to the distance in the down track direction was calculated by simulation analysis, and a relationship between the distance and the magnetic field intensity in the down track direction was determined.

Figure 12:
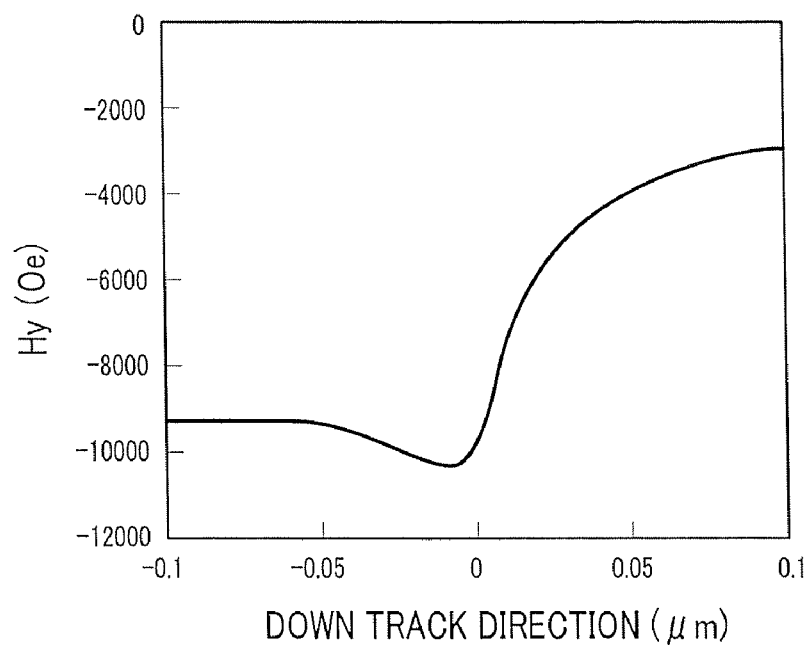
FIG. 12 is a graph showing simulation analysis test results in a first test example.

The results of the simulation analysis experiment are illustrated in FIG. 12. FIG. 12 is a graph illustrating the results of the simulation analysis experiment. The portion of the graph where the horizontal axis value is 0 indicates the extreme trailing side of the pole 22e (contact point with the flat plate part 240), and the right side of the graph indicates the side that is trailing the contact point, while the left side of the graph indicates the side that is leading the contact point.

As illustrated in FIG. 12, it was confirmed that a magnetic field with the necessary intensity for writing (magnetization reversal) could be applied even at a point 60 to 70 nm away from the pole 22e to the trailing side. From the results, it is understood that, if the waveguide 23 is positioned closer to the trailing side than the plasmon generator 24 such that the distance between the upper end (upper end surface) of the projection part 241 of the plasmon generator 24 and the lower end (surface that contacts the upper surface of the pole 22e) of the flat plate part 240 when viewed from the air bearing surface side, that is the thickness $T_{PG}$ of the plasmon generator 24, is a predetermined length (approximately 75 nm or less), stable magnetization reversal is possible because of the heating by the near-field light that is irradiated from the plasmon generator 24 located closer to the trailing side than the pole 22e.

Experimental Example 2

Using the model used in experimental example 1, the waveguide 23 was positioned closer to the trailing side than the plasmon generator 24, such that the distance between the upper end (upper end surface) of the projection part 241 of the plasmon generator 24 and the lower end (surface that contacts the upper surface of the pole 22e) of the flat plate part 240 when viewed from the air bearing surface side, that is the thickness $T_{PG}$ of the plasmon generator 24, was 70 nm, and the magnetic field intensity directly below the near-field light generating portion NFP of the plasmon generator 24 when the width in the Y direction of the pole 22e (track width direction) was varied in a range from 0.06 to 0.4 µm was calculated from the simulation analysis similar to experimental example 1. Then, the relationship between the magnetic field intensity and the pole width was determined.

Figure 13:
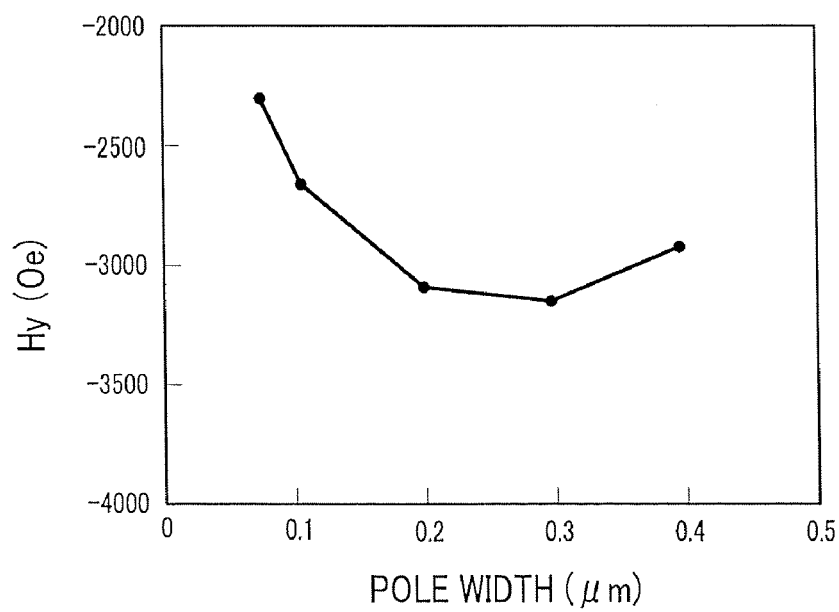
FIG. 13 is a graph showing the simulation analysis test results in a second test example.

The results of the simulation analysis experiment are illustrated in FIG. 13. FIG. 13 is a graph illustrating the results of the simulation analysis experiment. As illustrated in FIG. 13, it is understood that the width in the Y direction (track width direction) of the pole 22e is preferably from 0.2 to 0.3 μm in order to apply a suitable magnetic field of the intensity required for writing (magnetization reversal) directly below the near-field light generating portion NFP.

Experimental Example 3

A simulation analysis experiment was performed as described below concerning the relationship between the shape of the plasmon generator, near-field light peak intensity ($V^2m^2$), and the light spot diameter of the near-field light (in cross track direction and down track direction), based on the generation of near-field light by the near-field light generating optical system of the thermally-assisted magnetic recording head. With the present experimental example, the light spot diameter of the near-field light refers to the length in a predetermined direction (the cross track direction and the down track direction) in a cut plane when the light density distribution of the near-field light generated from the near-field light generating surface 24a is integrated, the integrated light density distribution is cut in half along a predetermined horizontal plane, and the light density distribution in one direction that includes a vertex of the light density distribution specifies a horizontal plane that includes light density that is 20% of the total light density after integrating.

The simulation analysis experiment was performed using a three-dimensional finite-difference time-domain method (FDTD method) which is electromagnetic field analysis.

The present experimental example implemented a model where the waveguide 23 of the thermally-assisted magnetic recording head 1 illustrated in FIGS. 5A and 5B was formed from $Ta_2O_5$ (refractive index $n_{WG}$=2.15) with a cross section having a width in the Y direction of 600 nm and a thickness in the Z direction of 400 nm, the protective layer 31 that realizes a function of cladding was formed from $SiO_2$ (refractive index $n_{BF}$=1.46), and the pole 22e was formed from a FeCo alloy with a width in the Y direction of 0.3 μm. Furthermore, with this model, the protrusion height $T_{PGC}$ of the projection part 241 of the plasmon generator 24 was 30 nm, the width in the Y direction of the projection part 241 was 20 nm, the gap G between the lower surface of the waveguide 23 and the upper surface of the projection part 241 was 25 nm, the height $T_{PG}$ of the plasmon generator 24 was 60 nm, and the length $H_{PG}$ in the X direction of the plasmon generator was 1.2 μm (first embodiment). Using this model, a simulation analysis experiment was performed where the laser light incident to the waveguide 23 was a Gaussian beam (15 mW) with transverse magnetic (TM) polarized light (the direction of oscillation of the laser light is in the direction perpendicular to the layer surface of the waveguide 23; Z direction) and having a wavelength of 800 nm.

Figure 14:
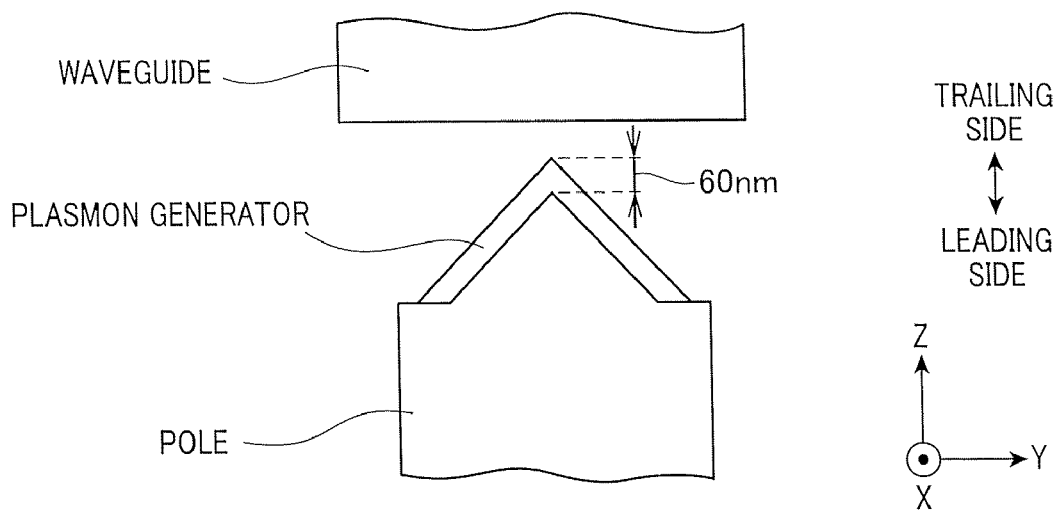
FIG. 14 is a plan view illustrating a shape of the waveguide, plasmon generator, and pole on or near a head part end surface of a thermally-assisted magnetic recording head of a first comparative example in a third test example.
Figure 15:
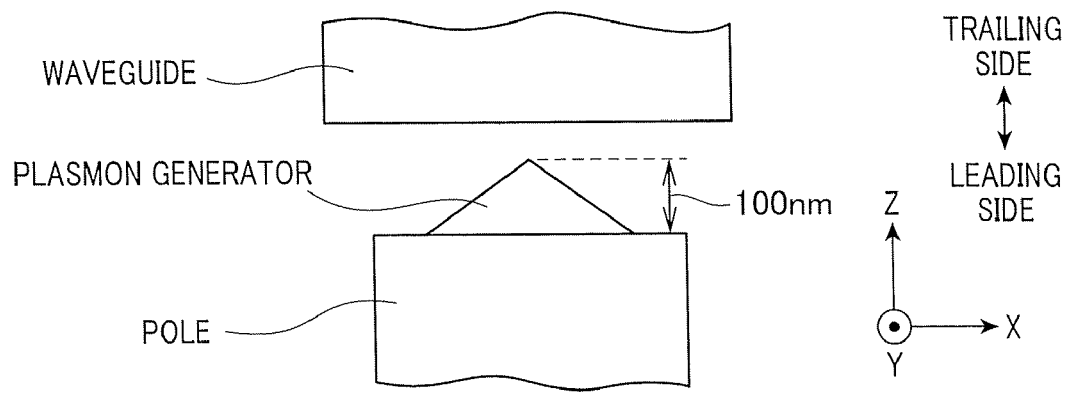
FIG. 15 is a plan view illustrating a shape of the waveguide, plasmon generator, and pole on or near a head part end surface of a thermally-assisted magnetic recording head of a second comparative example in a third test example.

As comparative examples, a simulation analysis experiment was performed in a manner similar to the aforementioned first embodiment on both a model (comparative example 1) where a pole with a triangular shape on an end surface when viewed from the ABS 11a, an inverted V-shaped plasmon generator that covers the pole, and the waveguide are provided as illustrated in FIG. 14 and where the distance between the vertex of the inverted V of the plasmon generator and the vertex of the triangular pole (vertex located to the extreme trailing side) was 60 nm, and a model (comparative example 2) where a pole with a rectangular shape on the end surface when viewed from the ABS 11a, a triangular plasmon generator provided on the pole, and the waveguide are provided as illustrated in FIG. 15 and where the distance between the pole and the vertex of the plasmon generator (vertex located on the extreme trailing side) was 100 nm. It is noted that the models of comparative examples 1 and 2 have configurations similar to the model of the first embodiment, except that the shape of the pole and the plasmon generator are different. The results of the simulation analysis experiment are shown in Table 1.

TABLE 1

|  | Light Peak Intensity ($V^2/m^2$) | Light Spot Diameter in Cross Track Direction (nm) | Light Spot Diameter in Down Track Direction (nm) |
| --- | --- | --- | --- |
| First Embodiment | 0.81 | 60.0 | 85.0 |
| Comparative Example 1 | 0.49 | 92.5 | 80.0 |
| Comparative Example 2 | 0.59 | 97.5 | 87.5 |

As shown in Table 1, it can be understood that with the thermally-assisted magnetic recording head having the configuration of first embodiment, the near-field light peak intensity (light density) can be increased, and the light spot diameter (particularly the light spot diameter in the cross track direction) can be reduced.

Experimental Example 4

A simulation analysis experiment was performed as described below on the relationship between the length in the X direction of the plasmon generator and the gap between the waveguide lower surface and the upper surface of the projection part of the plasmon generator, using the generation of near-field light by the near-field light generating optical system of the thermally-assisted magnetic recording head.

The simulation analysis experiment was performed using a three-dimensional finite-difference time-domain method (FDTD method) which is electromagnetic field analysis.

A simulation analysis was performed for the present experimental example using a model with essentially the same configuration as the configuration of the first embodiment in the aforementioned experimental example 3, by changing the gap G between the upper surface of the projection part 241 of the plasmon generator 24 and the lower surface of the waveguide 23 within a range of 5 to 50 nm, changing the length $H_{PG}$ in the X direction of the plasmon generator within a predetermined range, and calculating the near-field light peak intensity. The results of the simulation analysis experiment are illustrated in FIG. 16.

Figure 16:
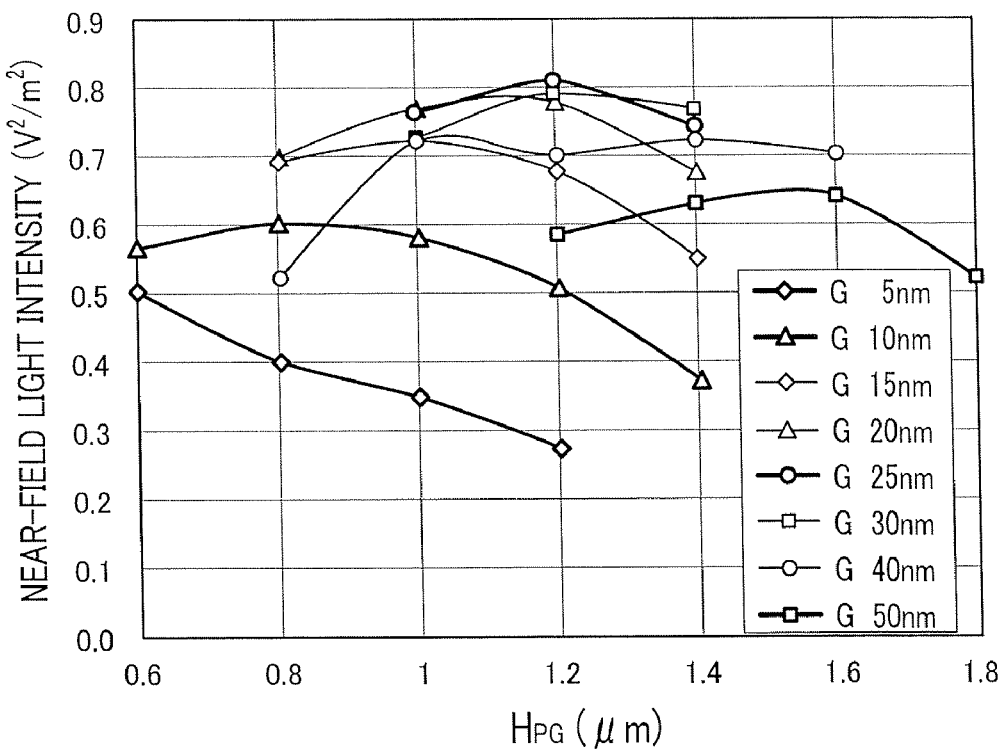
FIG. 16 is a graph showing the simulation analysis test results in a fourth test example.

FIG. 16 is a graph illustrating the results of the simulation analysis experiment. As illustrated in FIG. 16, it was confirmed that the length $H_{PG}$ in the X direction of the plasmon generator 24 is preferably in a range of 0.1 to 1.4 μm in order to obtain the desired light peak intensity (light density). Furthermore, it was confirmed that the gap G between the lower surface of the waveguide 23 and the upper surface of the projection part 241 of the plasmon generator 24 is preferably in a range of 15 to 40 nm in order to obtain the desired light peak intensity (light density).

Experimental Example 5

A simulation analysis experiment was performed as described below on the relationship to the shape of the upper surface of the projection part of the plasmon generator, based on the generation of near-field light by the near-field light generating optical system of the thermally-assisted magnetic recording head.

The simulation analysis experiment was performed using a three-dimensional finite-difference time-domain method (FDTD method) which is electromagnetic field analysis.

A simulation analysis was performed for the present experimental example using a model with a configuration that is essentially the same as the configuration of the first embodiment in the aforementioned experimental example 3 except that the shape of the upper surface of the projection part 241 of the plasmon generator 24 was the shape illustrated in FIG. 6, wherein the angle θ formed between the X direction and each of the two oblique sides of the upper surface of the projection part 241 of the plasmon generator 24 was changed within a range of 0 to 20°, and then the near-field light peak intensity was calculated. The results of the simulation analysis experiment are illustrated in FIG. 17.

Figure 17:
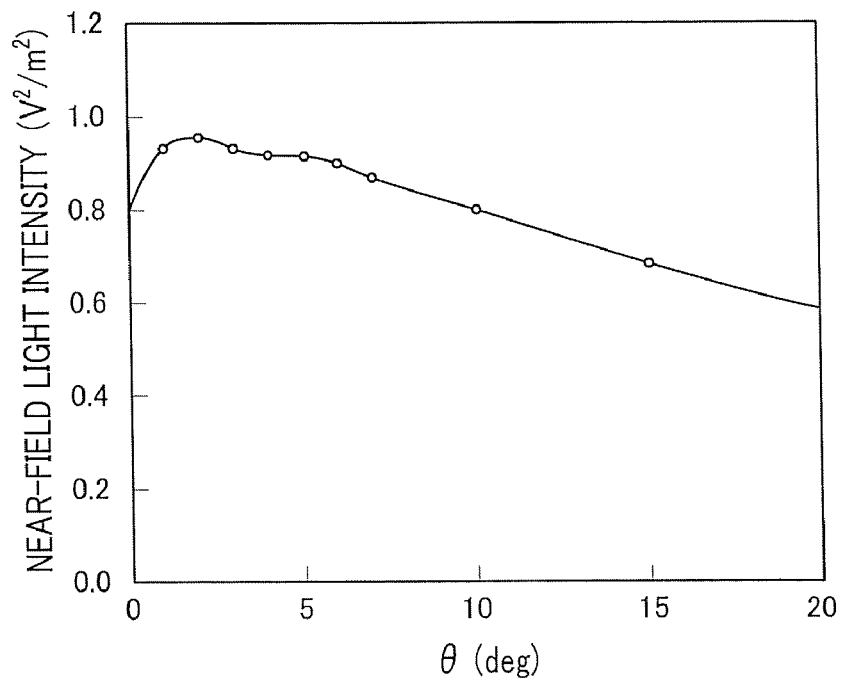
FIG. 17 is a graph showing the simulation analysis test results in a fifth test example.

FIG. 17 is a graph illustrating the results of the simulation analysis experiment. As illustrated in FIG. 17, it was confirmed that the angle θ formed between the X direction and each of the two oblique sides of the upper surface of the projection part 241 of the plasmon generator 24 is preferably greater than 0° and less than 10°, in order to increase the near-field light peak intensity (light density).

Experimental Example 6

A simulation analysis experiment was performed as described below on the relationship to the shape of the plasmon generator, based on the generation of near-field light by the near-field light generating optical system of the thermally-assisted magnetic recording head.

The simulation analysis experiment was performed using a three-dimensional finite-difference time-domain method (FDTD method) which is electromagnetic field analysis.

A simulation analysis was performed for the present experimental example, using a model with a configuration that is essentially the same as the configuration of the first embodiment in the aforementioned experimental example 3, except that the shape of the plasmon generator 24 was the shape illustrated in FIG. 10, wherein the protrusion height $T_{PGC}$ of the projection part 241 was changed within a range of 20 to 45 nm, the thickness of the plasmon generator 24 on the pole 22e (length $T_{PG}$ from the lower end (surface that contacts the upper surface of the pole 22e) of the plasmon generator 24 (flat plate part 240) when viewed from the air bearing surface side to the upper end (upper end surface) of the projection part 241, such that the waveguide 23 is positioned closer to the trailing side than the plasmon generator 24) was changed from 40 to 100 nm, and then the near-field light peak intensity and the light spot diameter in the cross track direction were calculated. The results of the simulation analysis experiment are illustrated in FIG. 18 and FIG. 19.

Figure 18:
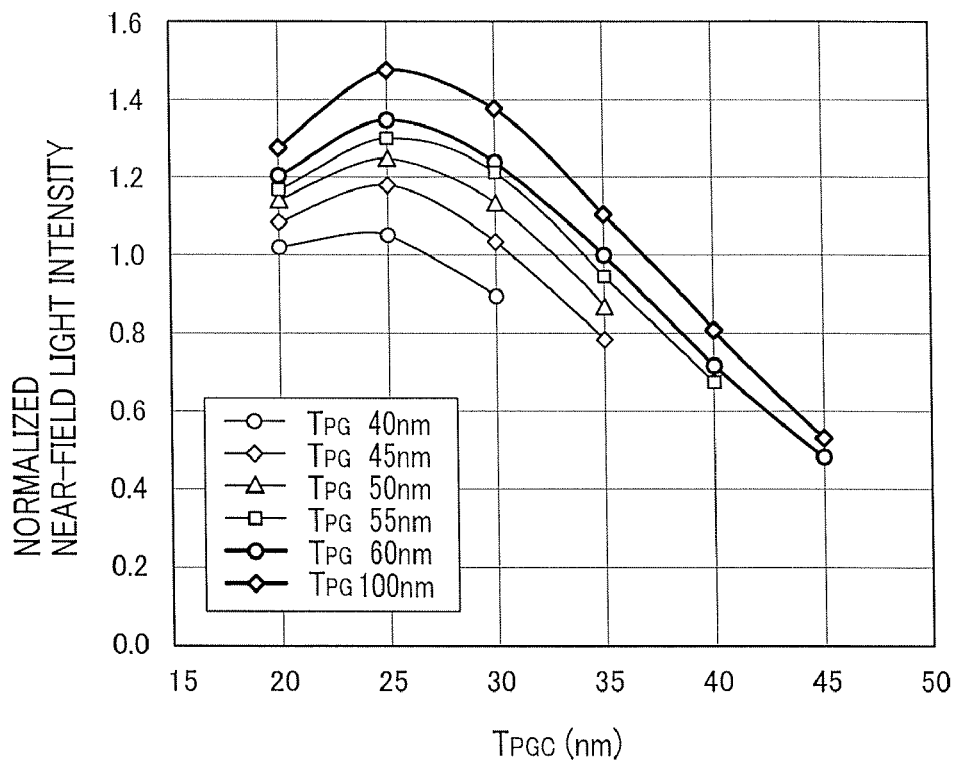
FIG. 18 is a graph showing the simulation analysis test results in a sixth test example.
Figure 19:
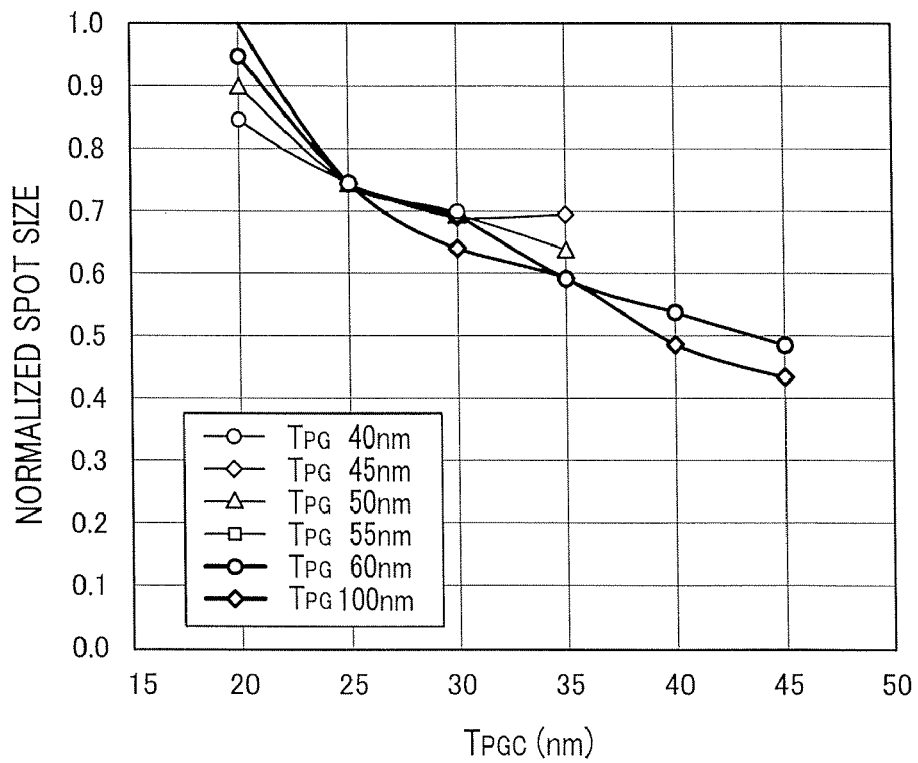
FIG. 19 is a graph showing the simulation analysis test results in a sixth test example.

FIG. 18 is a graph showing the results of the simulation analysis experiment based on the calculation results for the near-field light peak intensity, and FIG. 19 is a graph showing the results of the simulation analysis experiment based on the calculated results for the light spot diameter.

As illustrated in FIG. 18, it was confirmed that the protrusion height $T_{PGC}$ of the projection part 241 is preferably from 20 to 30 nm in order to increase the near-field light peak intensity (light density). Furthermore, it was confirmed that although the near-field light peak intensity (light density) can be increased by increasing the thickness $T_{PG}$ of the plasmon generator 24 on the pole 22e, when the thickness is 55 nm or higher, the dependency of the near-field light peak intensity (light density) to the thickness $T_{PG}$ of the plasmon generator 24 becomes weaker. Therefore, it was confirmed that a thickness $T_{PG}$ of 45 to 75 nm is practical.

Furthermore, as illustrated in FIG. 19, it is understood that when the protrusion height $T_{PGC}$ of the projection part 241 is low (for example less than 20 nm), the light spot diameter in the cross track direction increases and is not suitable for higher recording densities. Therefore, it was confirmed that the protrusion height $T_{PGC}$ of the projection part 241 is preferably 20 nm or higher in order to support higher recording densities.

What is claimed is:

1. A thermally-assisted magnetic recording head, comprising:
    a pole that generates a writing magnetic field from an end surface that forms a part of an air bearing surface that opposes a magnetic recording medium;
    a waveguide that propagates light to excite surface plasmon; and
    a plasmon generator that is provided between the pole and the waveguide and that generates near-field light from a near-field light generating end surface that forms a part of the air bearing surface by coupling with the light in a surface plasmon mode, wherein
    the plasmon generator includes a flat plate part and a projection part that projects from the flat plate part to the waveguide side and is provided closer to a trailing side than the pole is, wherein
    the flat plate part includes a first surface that faces the waveguide and a second surface that faces the pole, the first surface and the second surface are substantially parallel with each other,
    the projection part projects from the first surface to the waveguide side,
    a gap between a surface of the projection part that faces the waveguide and the waveguide is smaller than a gap between the first surface and the waveguide, as viewed from air bearing surface.

2. The thermally-assisted magnetic recording head according to claim 1, wherein
    the projection part is contiguous from the near-field light generating end surface along a light propagating direction of the waveguide.

3. The thermally-assisted magnetic recording head according to claim 1, wherein
    a protrusion height of the projection part is from 20 to 30 nm.

4. The thermally-assisted magnetic recording head according to claim 1, wherein
    a length of the plasmon generator in a light propagation direction of the waveguide is no less than a length of the pole in the light propagation direction.

5. The thermally-assisted magnetic recording head according to claim 1, wherein
    a length of the plasmon generator in a light propagation direction of the waveguide is from 1 to 14 μm.

6. The thermally-assisted magnetic recording head according to claim 1, wherein
    a width of the pole as viewed from the air bearing surface is from 0.2 to 0.3 μm, in a direction approximately orthogonal to a direction of travel of the magnetic recording medium.

7. The thermally-assisted magnetic recording head according to claim 1, wherein
    a shape of a surface of the projection part that opposes the waveguide is approximately a trapezoidal shape with a short side located on the air bearing surface side, a long side approximately parallel to the short side, and two oblique sides.

8. The thermally-assisted magnetic recording head according to claim 7, wherein
an angle formed by the oblique sides with regards to a direction perpendicular to the air bearing surface is less than 10°.

9. The thermally-assisted magnetic recording head according to claim 1, wherein
a length from a lower end of the flat plate part to an upper end of the projection part is from 45 to 75 nm, as viewed from the air bearing surface side such that the waveguide is located closer to the trailing side than the plasmon generator.

10. The thermally-assisted magnetic recording head according to claim 1, wherein
a gap between a lower end of the waveguide and an upper end of the projection part is from 15 to 40 nm, as viewed from the air bearing surface side such that the waveguide is located closer to the trailing side than the plasmon generator.

11. A head gimbal assembly, comprising:
the thermally-assisted magnetic recording head according to claim 1; and
a suspension that supports the thermally-assisted magnetic recording head.

12. A magnetic recording device, comprising:
a magnetic recording medium;
the thermally-assisted magnetic recording head according to claim 1; and
a positioning device that supports the thermally-assisted magnetic recording head and determines a position with regards to the magnetic recording medium.

13. The thermally-assisted magnetic recording head according to claim 1, wherein
the flat plate part has a predetermined thickness as viewed from the air bearing surface side.

14. The thermally-assisted magnetic recording head according to claim 1, wherein
a thickness of the flat plate part is from 15 to 55 nm as viewed from the air bearing surface side.

15. The thermally-assisted magnetic recording head according to claim 1, wherein
the flat plate part and the projection part have the same length in a light propagation direction,
the flat plate part is wider than the projection part in the track width direction, and
the flat plate part is wider than the pole and the waveguide in the track width direction.

16. A thermally-assisted magnetic recording head, comprising:
a pole that generates a writing magnetic field from an end surface that forms a part of an air bearing surface that opposes a magnetic recording medium;
a waveguide that propagates light to excite surface plasmon; and
a plasmon generator that is provided between the pole and the waveguide and that generates near-field light from a near-field light generating end surface that forms a part of the air bearing surface by coupling with the light in a surface plasmon mode, wherein
the plasmon generator includes a flat plate part and a projection part that projects from the flat plate part to the waveguide side and is provided closer to a trailing side than the pole is, wherein
the flat plate part and the projection part have the same length in a light propagation direction,
the flat plate part is wider than the projection part in the track width direction, and the flat plate part is wider than the pole and the waveguide in the track width direction.

17. A head gimbal assembly, comprising:
the thermally-assisted magnetic recording head according to claim 16; and
a suspension that supports the thermally-assisted magnetic recording head.

18. A magnetic recording device, comprising:
a magnetic recording medium;
the thermally-assisted magnetic recording head according to claim 16; and
a positioning device that supports the thermally-assisted magnetic recording head and determines a position with regards to the magnetic recording medium.

* * * * *